US011574489B2

(12) United States Patent
Muramatsu

(10) Patent No.: US 11,574,489 B2
(45) Date of Patent: Feb. 7, 2023

(54) IMAGE PROCESSING SYSTEM, IMAGE PROCESSING METHOD, AND STORAGE MEDIUM

(71) Applicant: CANON KABUSHIKI KAISHA, Tokyo (JP)

(72) Inventor: Yusuke Muramatsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 16/997,792

(22) Filed: Aug. 19, 2020

(65) Prior Publication Data

US 2021/0064859 A1 Mar. 4, 2021

(30) Foreign Application Priority Data

Aug. 30, 2019 (JP) ............................ JP2019-158665

(51) Int. Cl.

| | |
|---|---|
| ***G06V 30/32*** | (2022.01) |
| ***G06N 3/08*** | (2006.01) |
| ***G06K 9/62*** | (2022.01) |
| ***G06V 10/24*** | (2022.01) |
| ***G06V 30/414*** | (2022.01) |
| *G06V 30/10* | (2022.01) |

(52) U.S. Cl.

CPC ......... *G06V 30/333* (2022.01); *G06K 9/6256* (2013.01); *G06N 3/08* (2013.01); *G06V 10/24* (2022.01); *G06V 30/414* (2022.01); *G06V 30/10* (2022.01)

(58) Field of Classification Search

CPC .... G06V 30/10; G06V 30/333; G06V 30/414; G06V 10/24; G06K 9/6256; G06N 3/08

See application file for complete search history.

(56) References Cited

U.S. PATENT DOCUMENTS 10,671,892 B1 * 6/2020 Daskalov ............. G06N 3/0445
2019/0392207 A1 * 12/2019 Young ................... G06F 40/263

FOREIGN PATENT DOCUMENTS

JP 2010-122791 A 6/2010
JP 5908825 B2 4/2016

OTHER PUBLICATIONS

Jia, et al. (A CNN-based Approach to detecting Text from Images of whiteboards and Handwritten Notes), pp. 1-6. (Year: 2018).*

Long, J. et al., “Fully Convolutional Networks for Semantic Segmentation”, The IEEE Conference On Computer Vision and Pattern Recognition(CVPR), 2015, pp. 3431-3440.

* cited by examiner

*Primary Examiner* — Daniel G Mariam

(74) *Attorney, Agent, or Firm* — Canon U.S.A., Inc., IP Division

(57) ABSTRACT

According to the present disclosure, a handwriting image and a background image are combined, thereby generating a combined image, a correct answer label image is generated based on the handwriting image, and the generated combined image and the generated correct answer label image are used as learning data for training a neural network.

17 Claims, 27 Drawing Sheets

| PHONETIC GUIDE | | ADDRESS OF APPLICANT | |
|---|---|---|---|
| NAME OF APPLICANT | | | |

| BANK / SHINKIN BANK / UNION | | CENTRAL BRANCH / BRANCH / SUBBRANCH | | | | | |
|---|---|---|---|---|---|---|---|
| SAVINGS ACCOUNT / CHECKING ACCOUNT | ACCOUNT NUMBER | | | | | | |

| ACCOUNT HOLDER | ADDRESS | |
|---|---|---|
| | PHONETIC GUIDE | |
| | NAME | |

862
タナカタロウ
田中太郎
0-111-2222
FJT98
30
北山町4丁目

3/4

| ORDER SLIP | |
|---|---|
| DATE OF WRITING | |
| MEMBER NUMBER | |
| PHONETIC GUIDE | |
| NAME | |
| TELEPHONE NUMBER | |

| | |
|---|---|
| MODEL NUMBER | |
| QUANTITY | |
| SHIPPING ADDRESS | |

1201 3/4
1202 862
1203 タナカタロウ
1204 田中太郎
1205 D0-)11-2222
1206 FJT98
1207 30
1208 北山町4丁目

1219 ORDER SLIP
1211 DATE OF WRITING
1212 MEMBER NUMBER
1213 PHONETIC GUIDE
1214 NAME
1215 TELEPHONE NUMBER
1216 MODEL NUMBER
1217 QUANTITY
1218 SHIPPING ADDRESS

```
<?xml version="1.0" encoding="utf-8" ?>
<background file="001.png">
    ...
    ...
    <area coordinate="(20,110);(240,110);(240,220);(20,220)" category="string" />
    ...
    ...
    <area coordinate="(600,230);(650,230);(650,340);(600,340)" category="digit" />
    ...
    ...
</background>
```

1403

1404

```
<?xml version="1.0" encoding="utf-8" ?>
<background file="001.png">
    ...
    ...<area coordinate="(20,110);(240,110);(240,220);(20,220)" category="string" />
    ...
    ...<area coordinate="(240,110);(310,110);(310,140);(240,140)" category="circle" />
    ...
    ...<area coordinate="(50,240);(80,240);(80,270);(50,270)" category="check" />
    ...
    ...<area coordinate="(600,230);(650,230);(650,340);(600,340)" category="digit" />
    ...
</background>
```

1803

1804

| ORDER SLIP | |
|---|---|
| | DATE OF WRITING 3/4 |
| MEMBER NUMBER | 862 |
| PHONETIC GUIDE | タナカタロウ |
| NAME | 田中太郎 |
| TELEPHONE NUMBER | D0-111-2222 |

| MODEL NUMBER | ☑ FJT98<br>☐ NK37B<br>☐ MQQ41 |
|---|---|
| TIME OF DELIVERY | ⟨MORNING HOURS⟩<br>1 P.M. – 3 P.M.<br>3 P.M. – 5 P.M. |
| SHIPPING ADDRESS | 北山町4丁目 |

ORDER SLIP

| DATE OF WRITING | |
|---|---|
| MEMBER NUMBER | |
| PHONETIC GUIDE | |
| NAME | |
| TELEPHONE NUMBER | |

| MODEL NUMBER | ☐ FJT98<br>☐ NK37B<br>☐ MQQ41 |
|---|---|
| TIME OF DELIVERY | MORNING HOURS<br>1 P.M. – 3 P.M.<br>3 P.M. – 5 P.M. |
| SHIPPING ADDRESS | |

3/4

862
タナカタロウ
田中太郎

北山町4丁目

2415 — ORDER SLIP
DATE OF WRITING — 2401

MEMBER NUMBER — 2402
PHONETIC GUIDE — 2403
NAME — 2404
TELEPHONE NUMBER — 2405

2406 — MODEL NUMBER
☐ FJT98 — 2409
☐ NK37B — 2410
☐ MQ041 — 2411

TIME OF DELIVERY — 2407
MORNING HOURS — 2412
1 P.M. – 3 P.M. — 2413
3 P.M. – 5 P.M. — 2414

SHIPPING ADDRESS — 2408

FIG.25

| | | DATA GENERATION METHOD FOR ARRANGING IMAGES | DATA GENERATION METHOD ACCORDING TO PRESENT INVENTION |
|---|---|---|---|
| HANDWRITTEN CHARACTER | CONFORMITY | 0.671 | 0.880 |
| | RECALL | 0.810 | 0.889 |
| HANDWRITTEN CIRCLE | CONFORMITY | 0.247 | 0.665 |
| | RECALL | 0.066 | 0.732 |
| HANDWRITTEN CHECK | CONFORMITY | 0.404 | 0.829 |
| | RECALL | 0.542 | 0.979 |

IMAGE PROCESSING SYSTEM, IMAGE PROCESSING METHOD, AND STORAGE MEDIUM

BACKGROUND

Field

The present disclosure relates to an image processing system, an image processing method, and a storage medium.

Description of the Related Art

In recent years, business materials are increasingly computerized owing to changes in working environments with the prevalence of computers. Targets of such computerization include documents having a handwritten character. Thus, a technique for extracting a handwritten character is being considered.

The publication of Japanese Patent Application Laid-Open No. 2010-122791 discusses a technique for, in inspection of an insurance document, extracting a handwriting region and changing the number of manual checks based on whether a character of the content of the handwriting region can be recognized. According to this technique, it is possible to extract the handwritten character having informative value written in a handwriting region of a printed document.

In the technique discussed in the publication of Japanese Patent Application Laid-Open No. 2010-122791, however, the handwritten character is extracted using graphic information registered in advance, and therefore, a handwritten character cannot be accurately extracted from a document regarding which graphic information is not registered in advance.

SUMMARY

According to an aspect of the present disclosure, a handwriting image and a background image are combined to generate a combined image. A correct answer label image is generated by performing a binarization process on the handwriting image, and the generated combined image and the generated correct answer label image are used as learning data for training a neural network, wherein the neural network trained based on the learning data is a neural network for extracting a handwriting pixel from an input image.

Further features of the present disclosure will become apparent from the following description of exemplary embodiments with reference to the attached drawings.

BRIEF DESCRIPTION OF THE DRAWINGS

FIG. 25 is a table illustrating experimental results of verifying the usefulness of the present disclosure.

DESCRIPTION OF THE EMBODIMENTS

A description is given below of a method according to a first exemplary embodiment for using learning data to construct a neural network for extracting a handwritten character from a form image. An optical character recognition (OCR) process is executed on the extracted handwritten character, and the OCR result is saved in a database.

Figure 1:
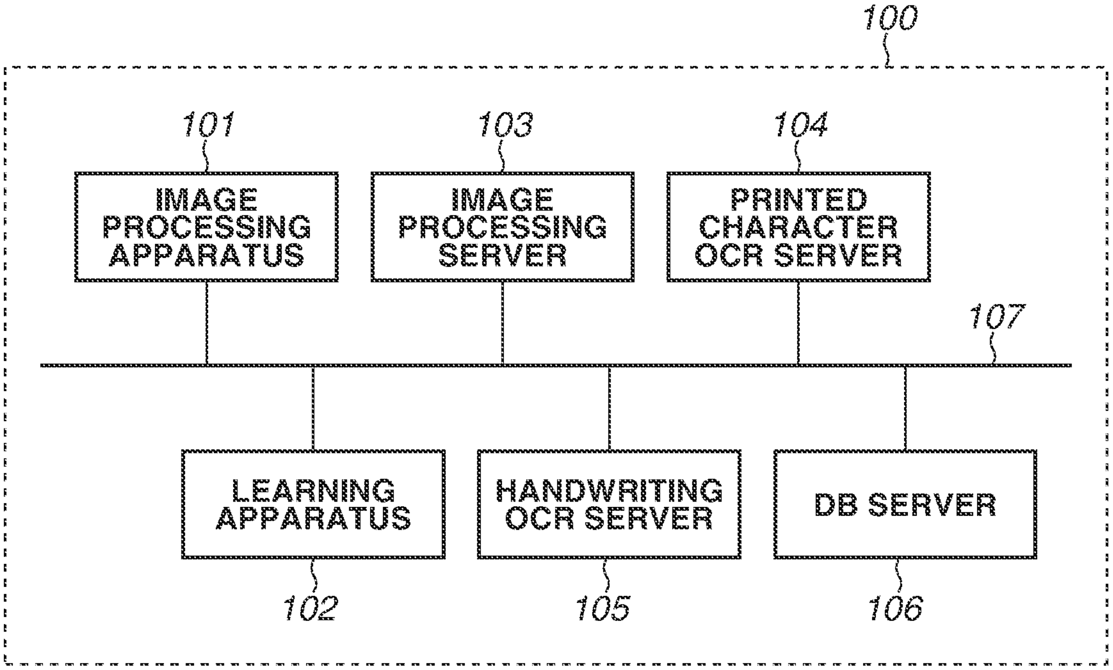
FIG. 1 is a diagram illustrating a configuration of an image processing system.

FIG. 1 is a diagram illustrating the configuration of an image processing system according to the present exemplary embodiment.

An image processing system 100 includes an image processing apparatus 101, a learning apparatus 102, an image processing server 103, a printed character OCR server 104, a handwriting OCR server 105, and a database (DB) server 106. The image processing apparatus 101 is connected to the learning apparatus 102, the image processing server 103, the printed character OCR server 104, the handwriting OCR server 105, and the DB server 106 via a network 107.

The image processing apparatus 101 is a digital multi-function peripheral and has a print function and a scan function. The image processing apparatus 101 uses the scan function to scan a document in which only handwriting is performed on a blank sheet, thereby generating image data (hereinafter, this image will be referred to as a "foreground original image"). The image processing apparatus 101 scans a plurality of documents, thereby obtaining a plurality of foreground original images. Meanwhile, the image processing apparatus 101 prints an electronic document and outputs a printed document. Further, the image processing apparatus 101 scans the printed document, thereby generating image data (hereinafter, this image will be referred to as a "background original image"). The image processing apparatus 101 scans a plurality of printed documents, thereby obtaining a plurality of background original images. The image processing apparatus 101 transmits the foreground original image and the background original image to the learning apparatus 102 via the network 107. Further, the image processing apparatus 101 scans a document including handwriting, thereby obtaining scanned image data as a processing target (hereinafter, this scanned image data will be referred to as a "processing target image"). Then, the image processing apparatus 101 transmits the processing target image to the image processing server 103 via the network 107.

The learning apparatus 102 generates, from the foreground original image and the background original image generated by the image processing apparatus 101, learning data to train a neural network for extracting the handwriting. Then, the learning apparatus 102 performs a learning process for training the neural network using the generated learning data, thereby generating a learning result (the parameters of the neural network). The learning apparatus 102 transmits the learning result to the image processing server 103 via the network 107.

The image processing server 103 performs a handwriting extraction process on the processing target image generated by the image processing apparatus 101, using the trained neural network. At this time, with the trained neural network that is obtained using the learning result generated by the learning apparatus 102, the image processing server 103 infers and extracts a handwriting pixel in the processing target image. In the present exemplary embodiment, the "handwriting pixel" refers to a pixel included in a handwritten character image within the processing target image. Then, the image processing server 103 determines a target region of printed character OCR and a target region of handwriting OCR based on the extraction result and transmits the determined regions together with the processing target image to the printed character OCR server 104 and the handwriting OCR server 105.

The printed character OCR server 104 can perform OCR on a printed character included in the processing target image. The printed character OCR server 104 receives from the image processing server 103 the processing target image and information regarding a region in the processing target image that includes a printed character as a target of OCR (hereinafter, this region will be referred to as a "printed character OCR target region"). Then, the printed character OCR server 104 performs OCR on the OCR target region for printed character in the processing target image, thereby acquiring text data. The printed character OCR server 104 transmits the text data to the image processing server 103.

The handwriting OCR server 105 can perform handwriting OCR on a handwritten character included in the processing target image. The handwriting OCR server 105 receives from the image processing server 103 the processing target image and information regarding a region in the processing target image that includes a handwritten character as a target of OCR (hereinafter, this region will be referred to as a "handwriting OCR target region"). Then, the handwriting OCR server 105 performs OCR on the handwriting OCR target region in the scanned image, thereby acquiring text data. The handwriting OCR server 105 transmits the text data to the image processing server 103.

The DB server 106 saves in a database the writing content of a form transmitted from the image processing server 103. The thus saved information can be referenced by another system.

Figure 2A:
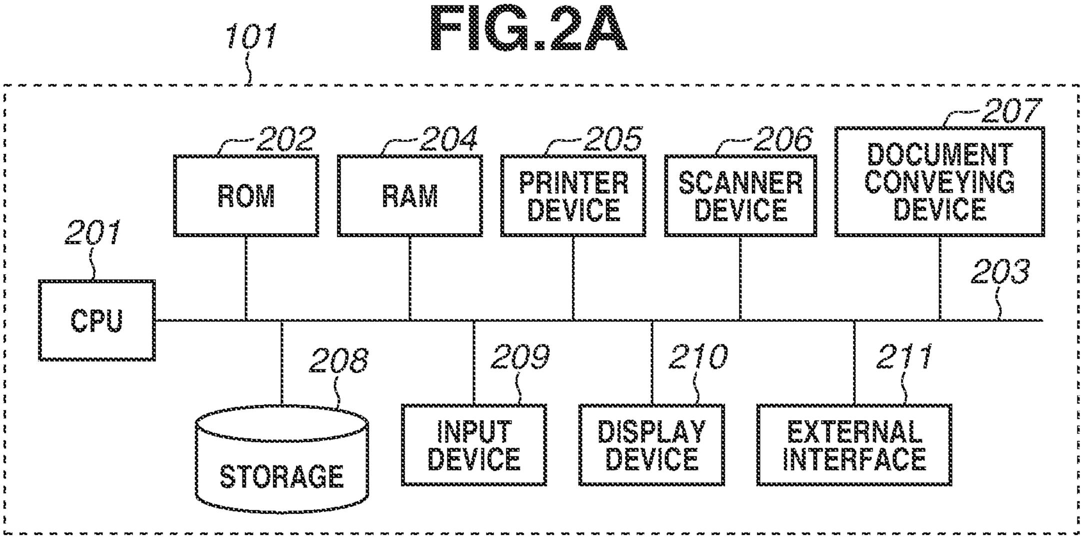
FIGS. 2A, 2B, and 2C are block diagrams illustrating examples of hardware configurations of an image processing apparatus, a learning apparatus, and an image processing server.
Figure 2B:
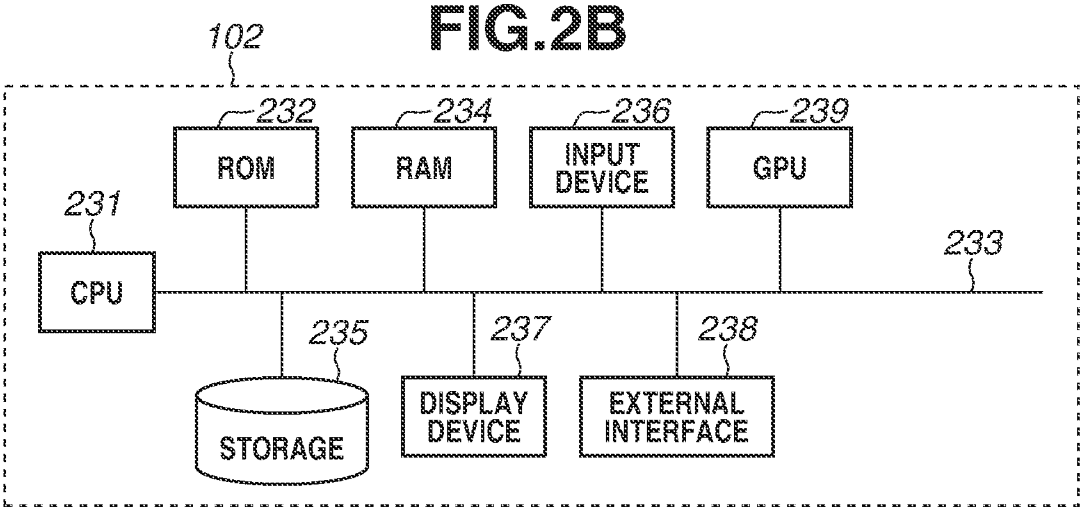
Figure 2C:
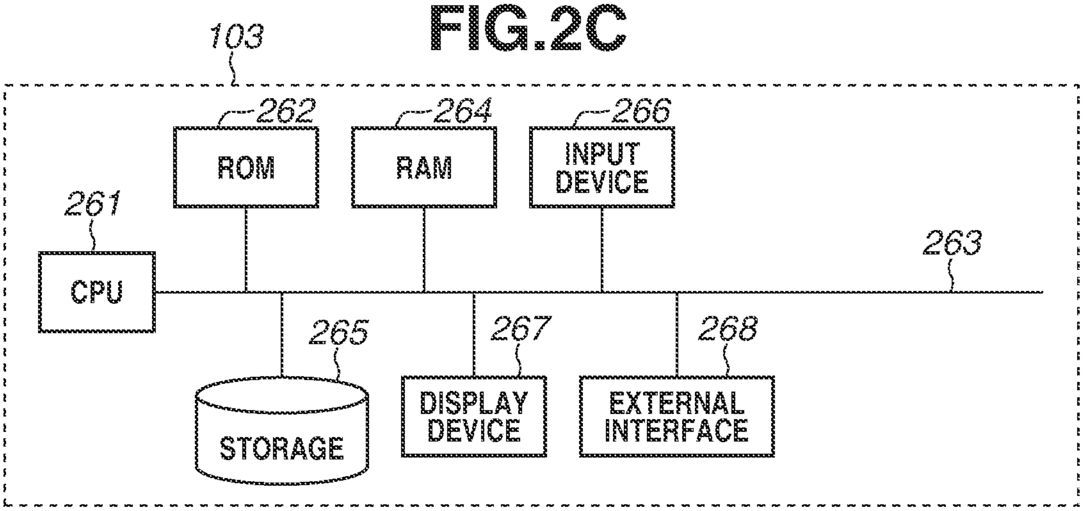

FIGS. 2A, 2B, and 2C are block diagrams illustrating examples of the hardware configurations of the image processing apparatus 101, the learning apparatus 102, and the image processing server 103. The hardware configurations of the printed character OCR server 104, the handwriting OCR server 105, and the DB server 106 are similar to that of the image processing server 103, and are not described here.

The image processing apparatus 101 in FIG. 2A includes a central processing unit (CPU) 201, a read-only memory (ROM) 202, a random-access memory (RAM) 204, a printer device 205, a scanner device 206, a document conveying device 207, storage 208, an input device 209, a display device 210, and an external interface 211. These devices are connected together by a data bus 203 so that the devices can communicate with each other.

The CPU 201 is a controller that performs overall control of the image processing apparatus 101. The CPU 201 causes a boot program stored in the ROM 202 to start an operating system (OS). On the OS, a controller program stored in the storage 208 is executed. The controller program is a program for controlling the image processing apparatus 101. The CPU 201 performs overall control of the devices connected to the CPU 201 by the data bus 203. The RAM 204 operates as a temporary storage area for a main memory, a work area for the CPU 201 or the like.

The printer device 205 prints image data on a sheet (a recording material). Examples of the printing method include an electrophotographic printing method using a photosensitive drum and a photosensitive belt, and an inkjet method for discharging ink from a micro-nozzle array, thereby directly printing an image on a sheet. Any of the printing methods may be used. The scanner device 206 scans a document such as paper using an optical reading device such as a charge-coupled device (CCD) to obtain electric signal data. Then, the scanner device 206 converts the electric signal data to generate scanned image data. The document conveying device 207 such as an auto document feeder (ADF) conveys documents placed on a document platen on the document conveying device 207 one by one to the scanner device 206.

The storage 208 is a readable and writable non-volatile memory such as a hard disk drive (HDD) and records various data such as the controller program. The input device 209 is a device composed of a touch panel and a hardware key. The input device 209 receives an operation instruction from a user. Then, the input device 209 transmits instruction information including an indication position to the CPU 201. The display device 210 is a device such as a liquid crystal display (LCD) or a cathode ray tube (CRT). The display device 210 displays display data generated by the CPU 201. Based on the instruction information received from the input device 209 and the display data displayed on the display device 210, the CPU 201 determines which operation is performed. Then, according to the determination result, the CPU 201 controls the image processing apparatus 101, also generates new display data to display on the display device 210.

The external interface 211 transmits and receives various types of data such as image data to and from an external device via a network such as a local area network (LAN), a telephone line, or proximity wireless by infrared light. The external interface 211 receives page description language (PDL) data from an external device such as the learning apparatus 102 or a personal computer (PC) (not illustrated). The CPU 201 interprets the PDL data received by the external interface 211, thereby generating an image. The generated image is printed by the printer device 205 or stored in the storage 208. Further, the external interface 211 receives image data from an external device such as the image processing server 103. The received image data is printed by the printer device 205, stored in the storage 208, or transmitted to another external device via the external interface 211.

The learning apparatus 102 in FIG. 2B includes a CPU 231, a ROM 232, a RAM 234, storage 235, an input device 236, a display device 237, an external interface 238, and a graphics processing unit (GPU) 239. These components can transmit and receive data to and from each other via a data bus 233.

The CPU 231 is a controller that controls the entirety of the learning apparatus 102. The CPU 231 causes a boot program stored in the ROM 232, which is a non-volatile memory, to start an OS. On the OS, a learning data generation program and a learning program stored in the storage 235 are executed. The CPU 231 executes the learning data generation program, thereby generating learning data. The CPU 231 executes the learning program, thereby training a neural network for extracting handwriting, using the learning data. The CPU 231 controls the components via a bus such as the data bus 233.

The RAM 234 operates as a temporary storage area such as a main memory or a work area for the CPU 231. The storage 235 is a readable and writable non-volatile memory and records the learning data generation program and the learning program.

The input device 236 is a device composed of a mouse and a keyboard. The display device 237 is similar to the display device 210 described with reference to FIG. 2A.

The external interface 238 is similar to the external interface 211 described with reference to FIG. 2A.

The GPU 239 is an image processing processor and cooperates with the CPU 231 to generate image data or train a neural network.

The image processing server 103 in FIG. 2C includes a CPU 261, a ROM 262, a RAM 264, storage 265, an input device 266, a display device 267, and an external interface 268. These components can transmit and receive data to and from each other via a data bus 263.

The CPU 261 is a controller that controls the entirety of the image processing server 103. The CPU 261 causes a boot program stored in the ROM 262, which is a non-volatile memory, to start an OS. On the OS, an image processing server program stored in the storage 265 is executed. The CPU 261 executes the image processing server program, thereby extracting and erasing a handwriting pixel from a processing target image. The CPU 261 controls the components via a bus such as the data bus 263.

The RAM 264 operates as a temporary storage area such as a main memory or a work area for the CPU 261. The storage 265 is a readable and writable non-volatile memory and records the image processing program.

The input device 266 is similar to the input device 236 described with reference to FIG. 2B. The display device 267 is similar to the display device 210 described with reference to FIG. 2A.

The external interface 268 is similar to the external interface 211 described with reference to FIG. 2A.

Figure 3:
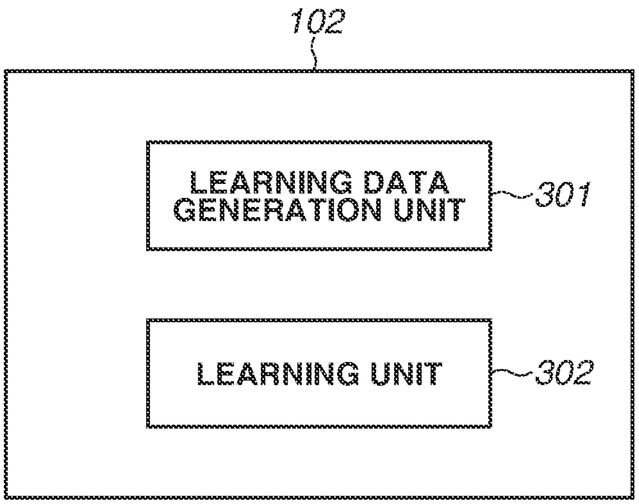
FIG. 3 is a block diagram illustrating an outline of a logical configuration of the learning apparatus.

FIG. 3 is a block diagram illustrating the outline of the logical configuration of the learning apparatus 102.

A learning data generation unit 301 generates learning data with which a neural network learns the process of extracting a handwriting pixel from an input image. The learning data generation unit 301 is implemented by the CPU 231 loading the learning data generation program into the RAM 234 and executing the learning data generation program.

A learning unit 302 executes a learning process for training the neural network using the learning data generated by the learning data generation unit 301. The learning unit 302 is implemented by the CPU 231 loading the learning program into the RAM 234 and executing the learning program.

The CPU 231 cooperates with the GPU 239 to execute a part of a calculation process that is executed by the learning data generation unit 301 or the learning unit 302.

Figure 4:
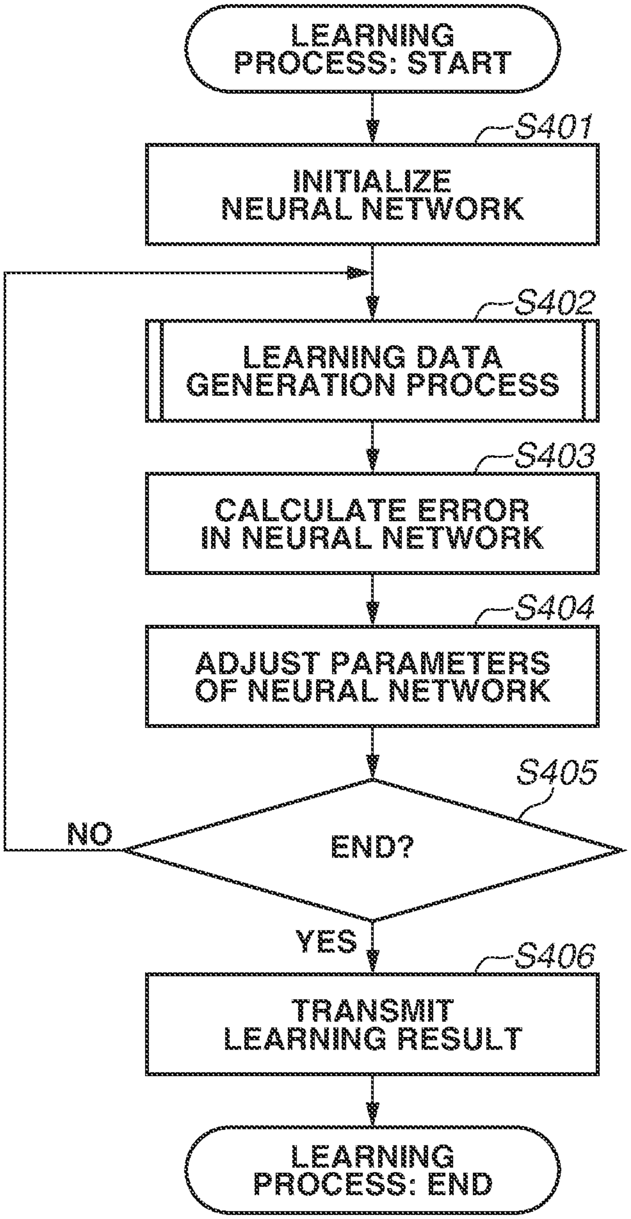
FIG. 4 is a flowchart of a learning process according to a first exemplary embodiment.

Next, a learning process by the learning apparatus 102 is described. FIG. 4 is a flowchart of the learning process. This processing is implemented by the learning unit 302 of the learning apparatus 102. The processing is started by the user performing a predetermined operation via the input device 209 of the image processing apparatus 101. In the present exemplary embodiment, a mini-batch method is used to train a neural network.

First, in step S401, the CPU 231 initializes a neural network. More specifically, the CPU 231 constructs a neural network and randomly determines and initializes the values of parameters included in the neural network. As the structure of the neural network to be constructed, various structures can be used. For example, the form of fully convolutional networks (FCN), discussed in Long, et al. "Fully Convolutional Networks for Semantic Segmentation", The IEEE conference On Computer Vision and Pattern Recognition (CVPR), 2015, pp. 3431-3440, can be employed.

In step S402, the CPU 231 acquires learning data. The CPU 231 executes a learning data generation process, thereby acquiring a predetermined number of (a mini-batch size, e.g., 10) pieces of learning data.

In step S403, the CPU 231 calculates an error in the neural network. More specifically, the CPU 231 inputs an input image included in each of the learning data to the neural network and obtains an output. The output is an image which is of the same image size as that of the input image and in which a pixel determined as handwriting as a prediction result has a value indicating handwriting, and a pixel determined as not handwriting has a value indicating not handwriting. Then, the CPU 231 evaluates the difference between the output and a correct answer label image, thereby obtaining an error. In the evaluation, cross entropy can be used as an indicator.

In step S404, the CPU 231 adjusts the parameters of the neural network. More specifically, based on the error calculated in step S403, the CPU 231 changes the parameter values of the neural network by a backpropagation method.

In step S405, the CPU 231 determines whether the learning is to be ended. This process is performed as follows. The CPU 231 determines whether the processes of steps S402 to S404 have been performed a predetermined number of times (e.g., 60000 times). The predetermined number of times can be determined by the user inputting an operation when the flowchart is started. If the processes of steps S402 to S404 have been performed the predetermined number of times (YES in step S405), the processing proceeds to step S406. If not (NO in step S405), the processing returns to step S402. In step S402, the CPU 231 continues to train the neural network.

In step S406, the CPU 231 transmits the parameters of the neural network adjusted in step S404 as a learning result to the image processing server 103.

Figure 5:
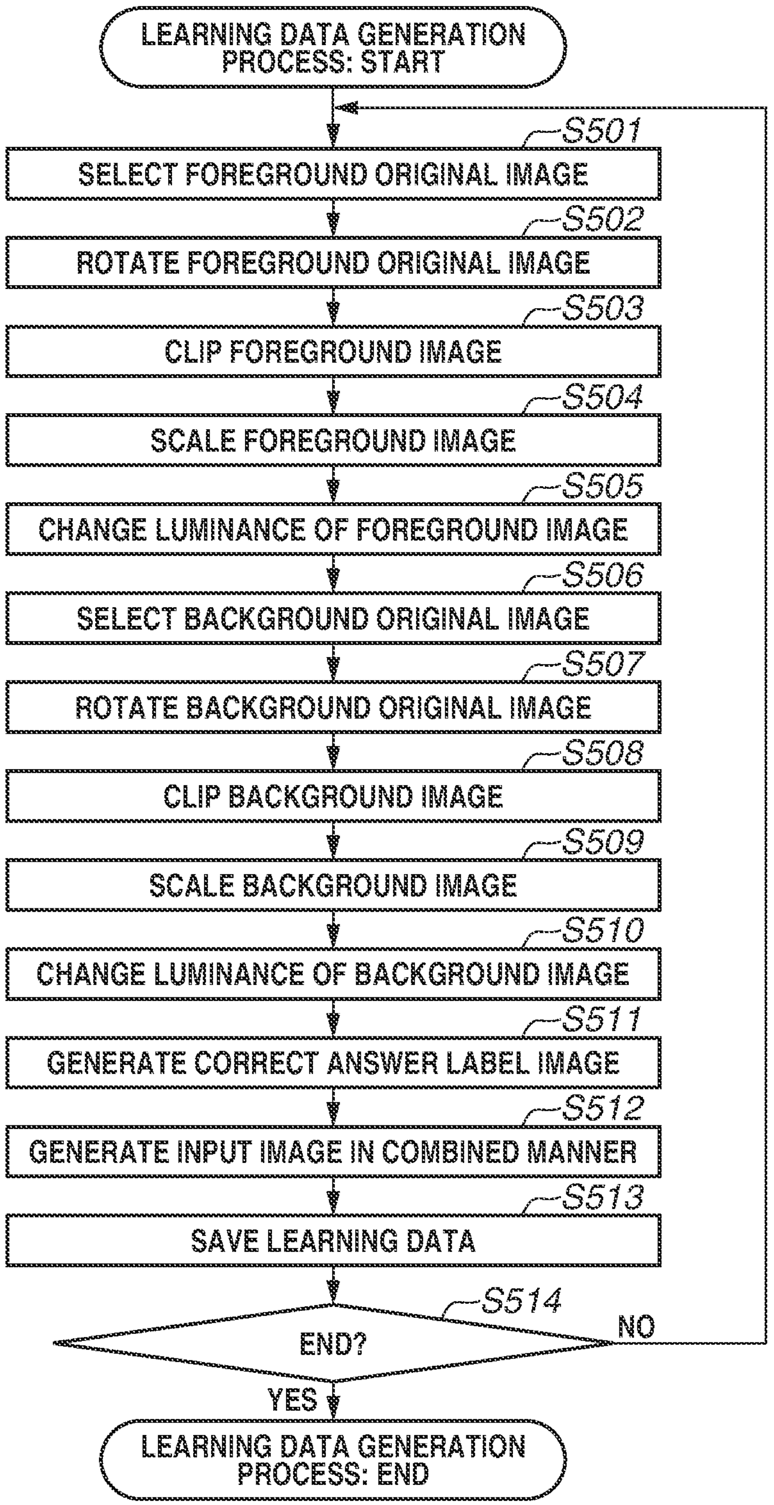
FIG. 5 is a flowchart of a learning data generation process according to the first exemplary embodiment.

Next, the learning data generation process by the learning apparatus 102 is described. FIG. 5 is a flowchart of the learning data generation process. This processing is implemented by the learning data generation unit 301 of the learning apparatus 102.

Figure 6:
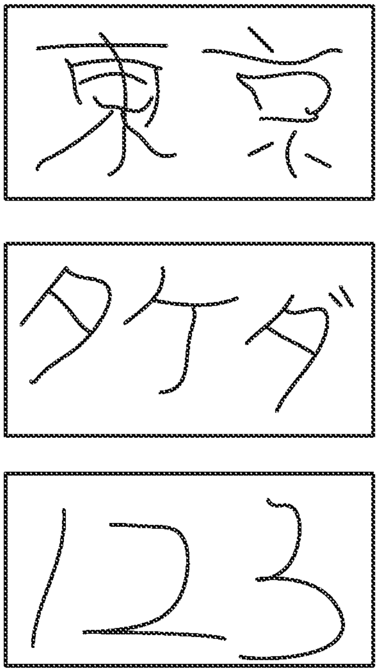
FIG. 6 is a diagram illustrating examples of a foreground original image according to the first exemplary embodiment.

First, in step S501, the CPU 231 selects and reads a foreground original image stored in the storage 235. FIG. 6 illustrates examples of the foreground original image. The foreground original image is an image in which only handwriting is written. The foreground original image is created by the image processing apparatus 101 scanning a document in which only handwriting is written in a blank sheet. A plurality of foreground original images is recorded in advance in the storage 235. The CPU 231 randomly selects one of the plurality of foreground original images.

In step S502, the CPU 231 processes the foreground original image read in step S501 by rotating the foreground original image. The angle of rotation is randomly selected in a predetermined range (e.g., between −10 degrees and 10 degrees) and determined.

In step S503, the CPU 231 clips a part (e.g., a size of 512 vertical×512 horizontal pixels) of the foreground original image, thereby generating image data (hereinafter, this image data will be referred to as a "foreground image"). The position of the clipping is randomly determined.

In step S504, the CPU 231 processes the foreground image generated in step S503 by scaling the foreground image. The scaling factor is randomly selected and determined within a predetermined range (e.g., between 50% and 150%). Further, the CPU 231 clips a part (e.g., a size of 256 vertical×256 horizontal pixels) of the scaled foreground image from the center, thereby updating the foreground image.

Figure 8A:
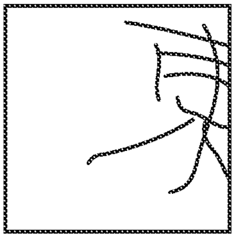
FIGS. 8A to 8D are diagrams illustrating examples of learning data created by the learning data generation process according to the first exemplary embodiment.

In step S505, the CPU 231 processes the foreground image by changing the luminance of each pixel of the foreground image. The CPU 231 converts the foreground image into a grayscale image and then changes the luminance of the foreground image using gamma correction. The gamma value is randomly selected and determined within a predetermined range (e.g., between 0.1 and 10.0). FIG. 8A illustrates an example of the foreground image at this time.

Figure 7:
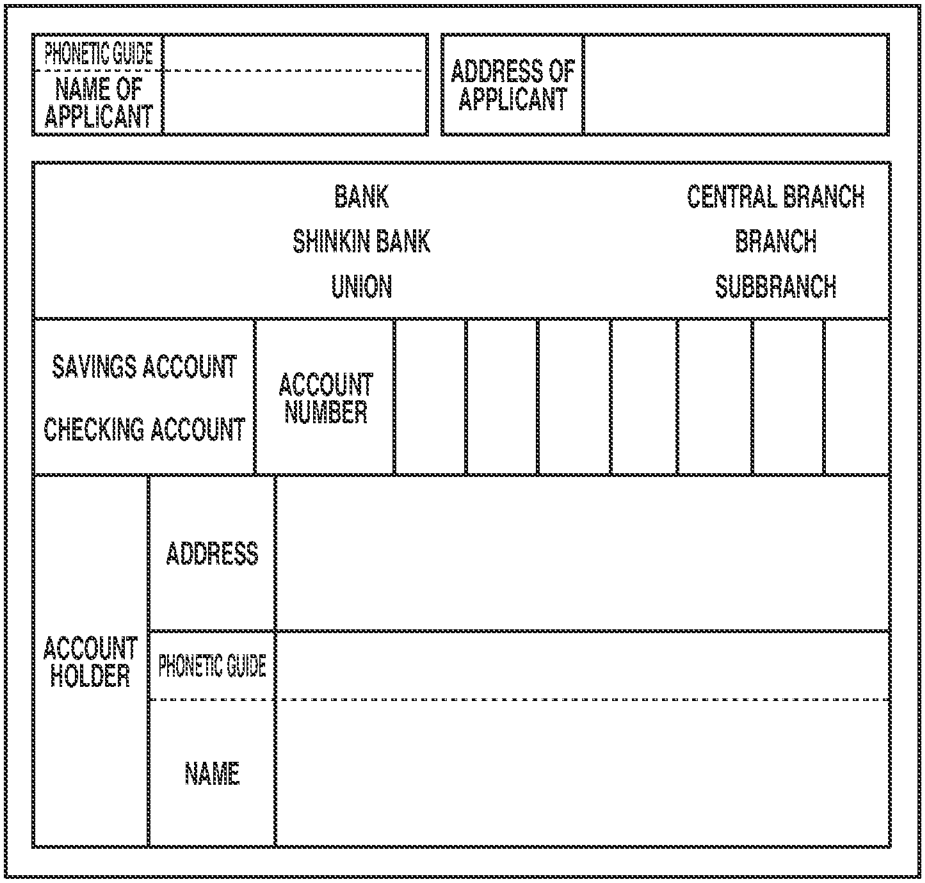
FIG. 7 is a diagram illustrating an example of a background original image according to the first exemplary embodiment.

In step S506, the CPU 231 selects and reads a background original image stored in the storage 235. FIG. 7 illustrates an example of the background original image. The background original image is obtained by directly scanning an electronic document printed by the image processing apparatus 101. Any content of the electronic document is possible so long as the electronic document does not include handwriting. It is, however, desirable that the content of the electronic document should have a feature (the size of a printed character or the presence or absence of a rule) similar to that of a document including handwriting to be scanned in an OCR request process. In the present exemplary embodiment, a handwritten character written in a sheet form is set as a target. Thus, a region of the form where handwriting is written is set as the background original image. A plurality of background original images is recorded in advance in the storage 235. The CPU 231 randomly selects one of the plurality of background original images.

In step S507, the CPU 231 processes the background original image read in step S506 by rotating the background original image. The angle of rotation is randomly selected and determined within a predetermined range (e.g., between −10 degrees and 10 degrees).

In step S508, the CPU 231 clips a part of the background original image (the same size as that of the foreground image clipped in step S503), thereby generating image data (hereinafter, this image data will be referred to as a "background image"). The position of the clipping is randomly determined.

In step S509, the CPU 231 processes the background image generated in step S508 by scaling the background image. The scaling factor is randomly selected and determined within a predetermined range (e.g., between 50% and 150%). Further, the CPU 231 clips a part of the scaled background image (the same size as that of the foreground image clipped in step S504) from the center, thereby updating the background image.

Figure 8B:
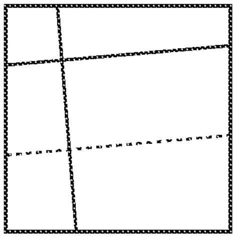

In step S510, the CPU 231 processes the background image by changing the luminance of each pixel of the background image. The CPU 231 converts the background image into a grayscale image to change the luminance of the background image using gamma correction. The gamma value is randomly selected and determined within a predetermined range (e.g., between 0.1 and 10.0). FIG. 8B illustrates an example of the background image at this time.

Through the above processing steps, the foreground image and the background image are obtained. The foreground image and the background image are each processed by rotating the image, scaling the image, and changing the luminance of the image. This process is carried out to bring diversity to learning data, thereby improving the generalization performance of a neural network to be trained using the learning data. Also each of the foreground original image and the background original image is used not in its original size, but by clipping a smaller partial image, taking into account the efficiency when the image is loaded into the RAM 234 or referenced by the CPU 231 or the GPU 239 in the learning process. Since the partial image is clipped by randomly determining its position, it is possible to generate a plurality of and a variety of pieces of learning data from a single foreground original image.

Figure 8C:
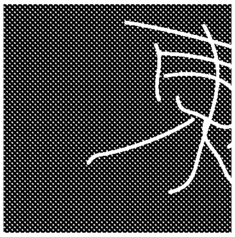

In step S511, the CPU 231 generates a correct answer label image for the foreground image. The CPU 231 performs a binarization process on the foreground image. Then, the CPU 231 generates, as a correct answer label image for the foreground image, image data in which a pixel having a value lower than a threshold determined in advance has a value indicating handwriting (e.g., 1, the same below), and other pixels have a value indicating not handwriting (e.g., 0, the same hereinafter). FIG. 8C illustrates an example of the correct answer label image created at this time. In FIG. 8C, a pixel determined as handwriting is represented in white, and a pixel determined as not handwriting is represented in black.

Figure 8D:
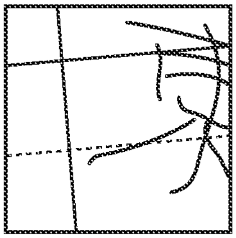

In step S512, the CPU 231 generates an input image of learning data in a combined manner. The CPU 231 compares the same coordinates of the foreground image and the background image and creates a new image in which the pixel value having the lower luminance is employed, thereby combining the images. FIG. 8D illustrates an example of the input image created here.

In step S513, the CPU 231 saves the input image generated in a combined manner in step S512 and the correct answer label image generated in step S511 in association with each other as the learning data in a predetermined region of the storage 235.

In step S514, the CPU 231 determines whether the learning data generation process is to be ended. If as many pieces of learning data as the number of pieces of learning data determined in advance are generated (YES in step S514), the processing ends. If not (NO in step S514), the processing returns to step S501.

Figure 9A:
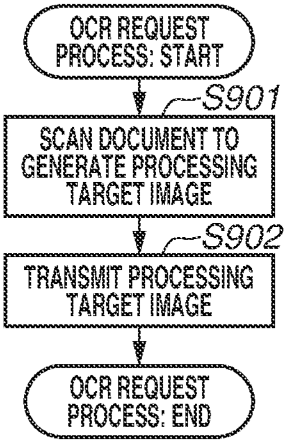
FIGS. 9A, 9B, and 9C are flowcharts of an optical character recognition (OCR) request process, an OCR process, and a handwriting OCR target region extraction process according to the first exemplary embodiment.

Next, an OCR request process by the image processing apparatus 101 is described. The image processing apparatus 101 scans a document including a printed character and a handwritten character, thereby obtaining a processing target image. Then, the image processing apparatus 101 transmits the processing target image to the image processing server 103 and requests the image processing server 103 to perform OCR on the printed character and the handwritten character. FIG. 9A is a flowchart of the OCR request process. The processing is implemented by the CPU 201 of the image processing apparatus 101 reading the controller program recorded in the storage 208, loading the controller program into the RAM 204, and executing the controller program. The processing is started by the user performing a predetermined operation via the input device 209 of the image processing apparatus 101.

Figure 10A:
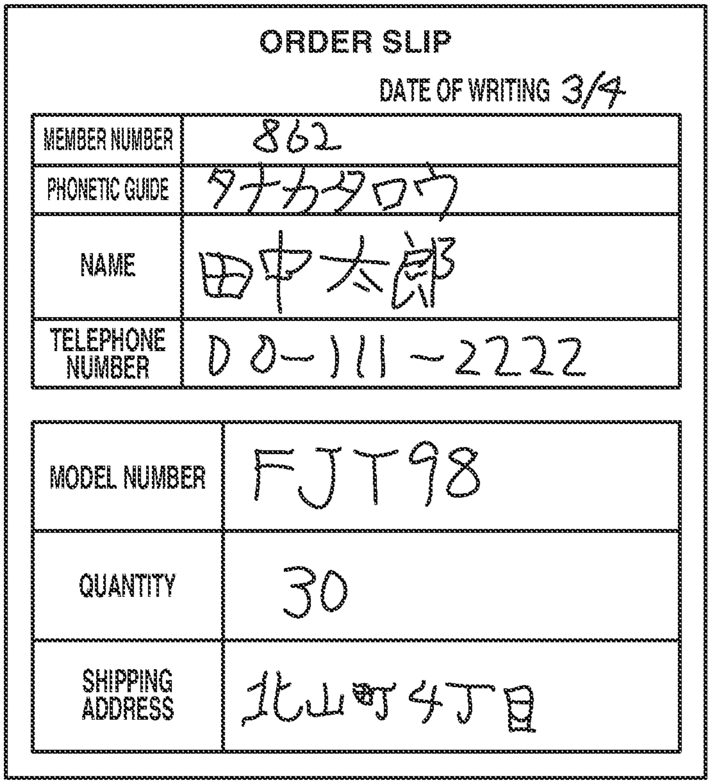
FIGS. 10A and 10B are diagrams illustrating an example of a processing target image and a result of estimating a handwriting pixel from the processing target image according to the first exemplary embodiment.

In step S901, the CPU 201 controls the scanner device 206 and the document conveying device 207 to scan a document, thereby generating a processing target image. The processing target image is generated as full-color (three RGB channels) image data. The document to be scanned is a form such as an order slip as illustrated in FIG. 10A, where a value is written in handwriting to the right of each term.

In step S902, the CPU 201 transmits the handwriting processing target generated in step S901 to the image processing server 103 via the external interface 211.

Figure 9B:
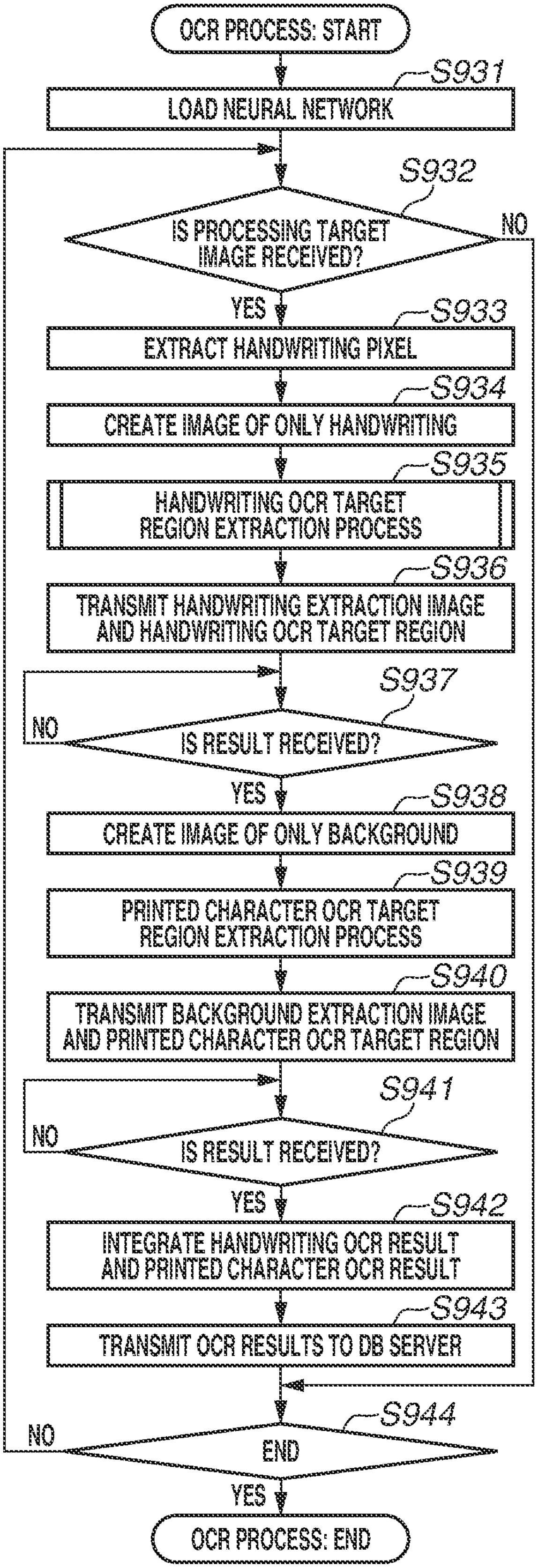

Next, an OCR process by the image processing server 103 is described. The image processing server 103 receives a processing target image from the image processing apparatus 101 and performs OCR on a printed character and a handwritten character included in this scanned image data, thereby obtaining text data. The image processing server 103 causes the printed character OCR server 104 to execute the OCR on the printed character. The image processing server 103 causes the handwriting OCR server 105 to execute the OCR on the handwritten character. FIG. 9B is a flowchart of the OCR process. The processing is implemented by the CPU 261 reading the image processing server program stored in the storage 265, loading the image processing server program into the RAM 264, and executing the image processing server program. The processing is started by the user turning on the power supply of the image processing server 103.

First, in step S931, the CPU 261 loads a neural network for extracting handwriting. First, the CPU 261 constructs the same neural network as that in step S401 in the flowchart in FIG. 4. Next, the CPU 261 reflects on the constructed neural network the learning result (the parameters of the neural network) transmitted from the learning apparatus 102 in step S406 in the flowchart in FIG. 4, thereby obtaining a neural network which has been trained with the handwriting extraction process. The trained neural network is also termed a "trained model".

In step S932, the CPU 261 determines whether a processing target image as a processing target is received from the image processing apparatus 101. If the processing target image is received via the external interface 268 (YES in step S932), the processing proceeds to step S933. If not (NO in step S932), the processing proceeds to step S944.

Figure 10B:
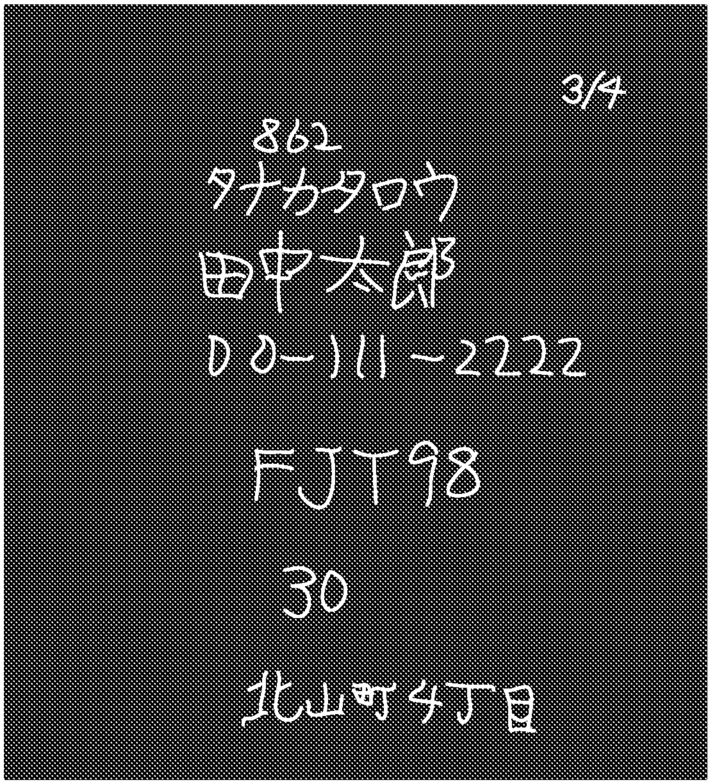

In step S933, the CPU 261 extracts a handwriting pixel from the processing target image received from the image processing apparatus 101. The CPU 261 converts the processing target image into a grayscale image. Then, the CPU 261 inputs the processing target image as the grayscale image to the trained neural network constructed in step S931 and causes the trained neural network to estimate a handwriting pixel. As a result, image data is obtained which is of the same size as that of the processing target image, and in which a value indicating handwriting (e.g., 1) is recorded in a pixel determined as handwriting, and a value indicating not handwriting (e.g., 0) is recorded in a pixel determined as not handwriting, respectively. FIG. 10B illustrates a resulting image obtained by estimating a handwriting pixel using an image in FIG. 10A as the processing target image (to facilitate visualization of the result, a pixel having a value of 0 is represented in black, and a pixel having a value of 1 is represented in white). Hereinafter, this image data will be referred to as an "estimation result".

Figure 11A:
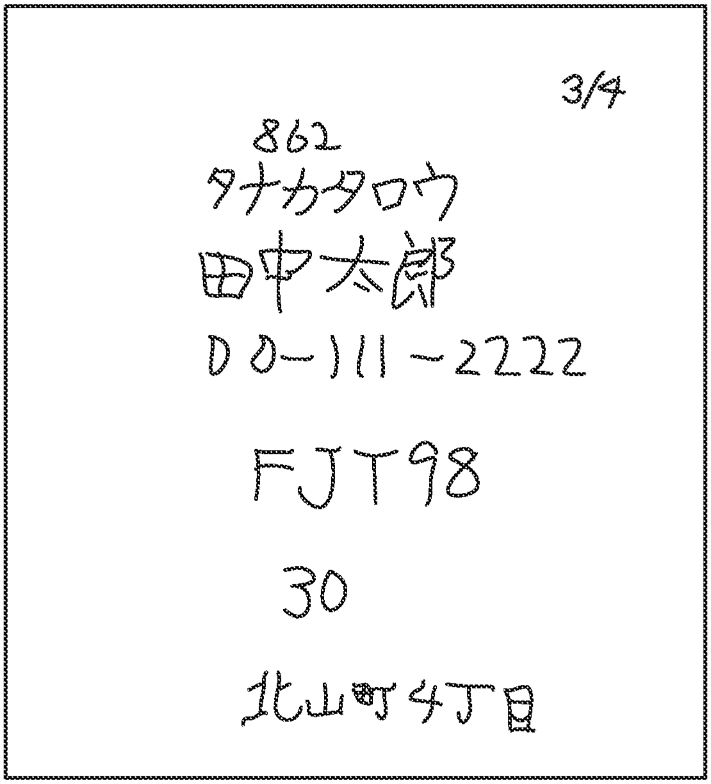
FIGS. 11A and 11B are diagrams illustrating a handwriting extraction image and a background extraction image according to the first exemplary embodiment.

In step S934, the CPU 261 creates an image of only handwriting by using the estimation result created in step S933 as a mask. Specifically, the CPU 261 creates an image which is of the same size as that of the processing target image and in which the pixel value in the processing target image is substituted into the coordinates that correspond to handwriting based on the estimation result, and 255 is substituted into the coordinates that do not correspond to handwriting based on the estimation result. Hereinafter, this image will be referred to as a "handwriting extraction image". FIG. 11A illustrates the handwriting extraction image created here.

Figure 12A:
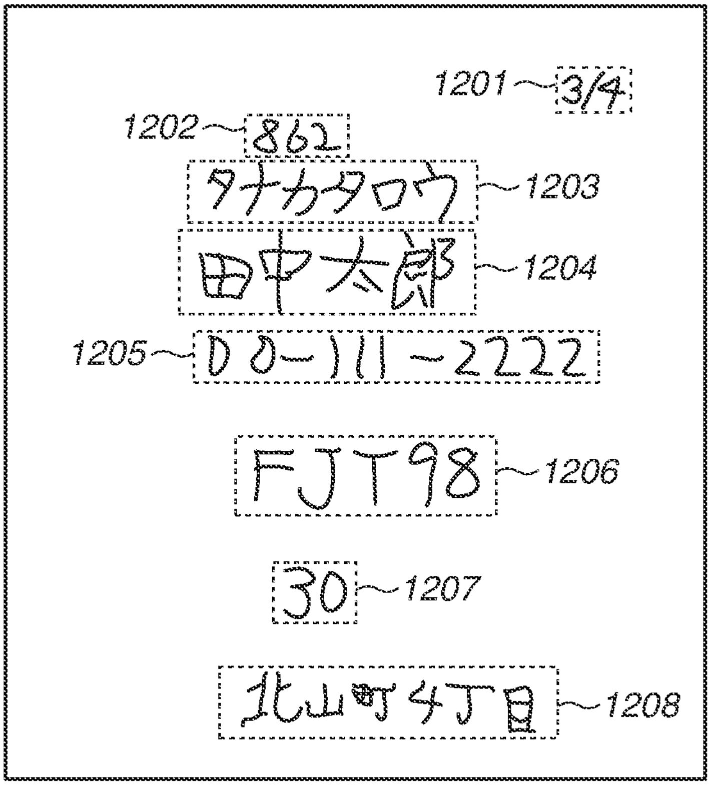
FIGS. 12A and 12B are diagrams illustrating a handwriting OCR target region and a printed character OCR target region according to the first exemplary embodiment.

In step S935, the CPU 261 performs a process for extracting a handwriting OCR target region and determines a region as a target of handwriting OCR within the handwriting extraction image. The details of this process will be described below. Handwriting OCR target regions obtained as a result of the process are illustrated as regions 1201 to 1208 in FIG. 12A.

In step S936, the CPU 261 transmits each handwriting OCR target region extracted in step S935 and the handwriting extraction image to the handwriting OCR server 105 via the external interface 268 and causes the handwriting OCR server 105 to execute a handwriting OCR process suitable for recognizing a handwritten character. The handwriting OCR can be implemented by applying a known technique.

In step S937, the CPU 261 determines whether a handwriting OCR result is received from the handwriting OCR server 105. The handwriting OCR result is text data obtained by the handwriting OCR server 105 recognizing a handwritten character included in the handwriting OCR target region. If the handwriting OCR result is received from the handwriting OCR server 105 via the external interface 268 (YES in step S937), the processing proceeds to step S938. If not (NO in step S937), the process of step S937 is repeated.

Figure 11B:
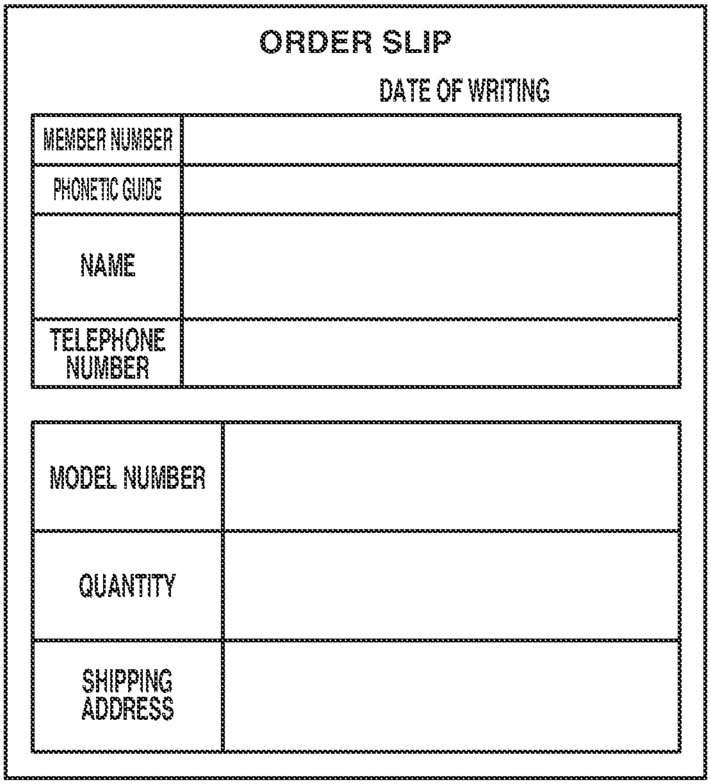

In step S938, the CPU 261 creates an image of only the background using the estimation result created in step S933 as a mask. Specifically, the CPU 261 creates an image which is of the same size as that of the processing target image and in which the pixel value in the processing target image is substituted into the coordinates that does not correspond to handwriting based on the estimation result, and 255 is substituted into the coordinates that correspond to handwriting based on the estimation result. Hereinafter, this image will be referred to as a "background extraction image". FIG. 11B illustrates the background extraction image created at this time.

Figure 12B:
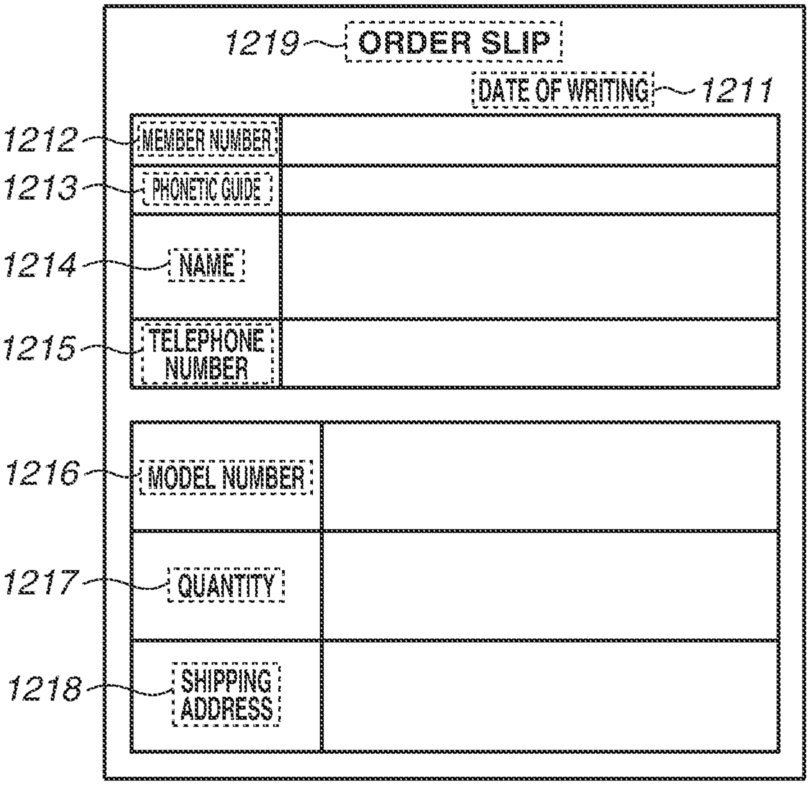

In step S939, the CPU 261 performs a process for extracting a printed character OCR target region and determines a region as a target of printed character OCR within the background extraction image. The process is implemented by a technique discussed in Japanese Patent No. 5908825, for example. OCR target regions obtained as a result of the process are illustrated as regions 1211 to 1219 in FIG. 12B.

In step S940, the CPU 261 transmits each printed character OCR target region extracted in step S939 and the background extraction image to the printed character OCR server 104 via the external interface 268 and causes the printed character OCR server 104 to execute a printed character OCR process suitable for recognizing a printed character. The printed character OCR can be achieved by applying a known technique.

In step S941, the CPU 261 determines whether a printed character OCR result is received from the printed character OCR server 104. The printed character OCR result is text data obtained by the printed character OCR server 104 recognizing a printed character included in the printed character OCR target region. If the printed character OCR result is received from the printed character OCR server 104 via the external interface 268 (YES in step S941), the processing proceeds to step S942. If not (NO in step S941), the process of step S941 is repeated.

In step S942, the CPU 261 integrates the handwriting OCR result received from the handwriting OCR server 105 and the printed character OCR result received from the printed character OCR server 104. The CPU 261 evaluates the positional relationship between the handwriting OCR target region and the printed character OCR target region from which the handwriting OCR result and the printed character OCR result are obtained, and evaluates the semantic appropriateness when the printed character OCR result is considered as an item name and the handwriting OCR result as a value, thereby estimating a pair of an item and a value. For example, if the closest region in the background extraction image to the region 1201 in the handwriting extraction image is the region 1211, and the OCR result "date of writing" of the region 1211 is an item name, the OCR result, "¾", of the region 1201 includes a date and therefore is highly appropriate as a value. Thus, the CPU 261 estimates that the OCR result of the region 1201 and the OCR result of the region 1211 are a pair of an item and a value regarding the date of writing. By a similar method, the CPU 261 estimates that the regions 1202 and 1212, the regions 1203 and 1213, the regions 1204 and 1214, and the regions 1205 and 1215 are also pairs of an item and a value. By a similar method, the CPU 261 estimates that the OCR results of the regions 1206 and 1216, the regions 1207 and 1217, and the regions 1208 and 1218 are also pairs of an item and a value.

In step S943, the CPU 261 outputs the handwriting OCR result and the printed character OCR result. The CPU 261 transmits the pair of the item and the value obtained in step S942 to the DB server 106 via the external interface 268 and saves the pair of the item and the value in the DB server 106.

In step S944, the CPU 261 determines whether the process is to be ended. When the user performs a predetermined operation for turning off the power supply of the image processing server 103 (YES in step S944), the processing ends. If not (NO in step S944), the processing returns to step S932.

Figure 9C:
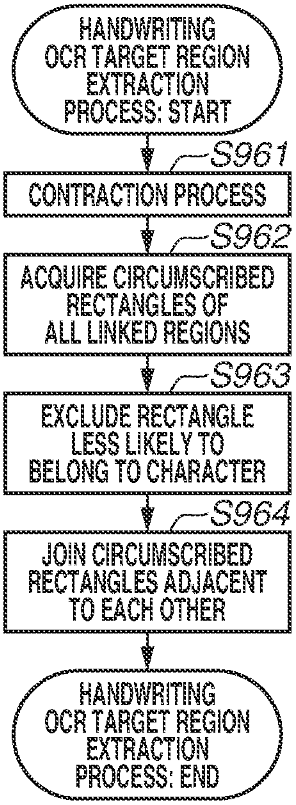

Next, the handwriting OCR target region extraction process by the image processing server 103 is described. FIG. 9C is a flowchart of a process for extracting the handwriting OCR target region. The processing is implemented by the CPU 261 reading the image processing server program stored in the storage 265, loading the image processing server program into the RAM 264, and executing the image processing server program. The processing is executed by inputting the handwriting extraction image in step S935 or S939 in the OCR process.

First, in step S961, the CPU 261 performs a contraction process on the input image. The process is carried out to thicken a character, thereby connecting a small part, such as a radical or a dot included in the character, to a character in the periphery of the character to prevent the character from being treated as noise in a subsequent process (step S963).

In step S962, the CPU 261 acquires circumscribed rectangles of regions where black pixels are linked together. The CPU 261 searches the image subjected to the contraction process in step S961 for regions where black pixels are linked together, and individually creates circumscribed rectangles of all these regions.

In step S963, the CPU 261 excludes a rectangle less likely to belong to a character from among the circumscribed rectangles created in step S962. For example, a certain range is provided for the length of the side or the area of a rectangle, and a rectangle out of the range is estimated as not belonging to a character and removed. The process excludes a rectangle surrounding a chart, or a rectangle surrounding small noise.

In step S964, the CPU 261 links circumscribed rectangles adjacent to each other. If other rectangles are present to the left or right of and within certain distances from each rectangle remaining as a result of step S963, the CPU 261 replaces these rectangles with a new rectangle by joining all these rectangles. The process can form a rectangle surrounding not a character alone but the entirety of a sentence. Each rectangle obtained as a result is set as an OCR target region.

As illustrated above in the present exemplary embodiment, it is possible to generate learning data for training a neural network for extracting handwriting, from image data including only handwriting and image data including only a print content by combining the handwriting and the print content in an overlapping manner. Then, it is possible to perform learning by training the neural network using the learning data, extract target regions of handwriting OCR and printed character OCR from scanned image data using the result of the learning, and extract and save a written content as a pair of an item and a value. Without requiring the work of registering a handwriting OCR target region in advance with respect to each form, it is possible to extract a handwriting OCR target region and process the handwriting OCR target region by inputting it into the handwriting OCR target region. Also in the case of an irregular form that cannot be registered in advance, without requiring of a person the work of specifying the handwriting OCR target region, it is possible to extract the handwriting OCR target region and process the handwriting OCR target region by inputting the handwriting OCR target region.

In the present exemplary embodiment, the learning data generation unit 301 and the learning unit 302 are implemented by the learning apparatus 102, but may be implemented by separate apparatuses. In this case, the apparatus that implements the learning data generation unit 301 transmits learning data generated by the learning data generation unit 301 to the apparatus that implements the learning unit 302. Then, the learning unit 302 trains a neural network based on the received learning data.

In the exemplary embodiment, in the learning process, learning data is generated by calling the learning data generation process. Alternatively, a large amount of learning data may be generated in advance through the learning data generation process, and when the learning process is performed, learning data corresponding to a mini-batch size may be sampled as needed from the large amount of learning data.

Alternatively, a foreground original image may be generated by scanning a document in which only a mark is formed, or a foreground original image may be generated by scanning the back side of thin paper on which an electronic document is printed. Thus, it is possible to generate, in a combined manner, learning data for training a neural network for detecting a pixel corresponding to a stamp or show-through.

Alternatively, the foreground image and the correct answer label image for the foreground image that are obtained in steps S505 and S511 in the flowchart in FIG. 5 may be included in learning data. Yet alternatively, the background image obtained in step S510 and an image which is of the same image size as that of the background image and in which all the pixels have a value indicating not handwriting, as a correct answer label image for the background image may be generated and included in the learning data.

In the present exemplary embodiment, the input image is generated as a grayscale image. Alternatively, the input image may be generated in another format such as a full-color image.

A second exemplary embodiment is described below. In the present exemplary embodiment, another method for generating the learning data in a combined manner is described. When an input image of learning data is generated in a combined manner, a region in a background image where a handwriting image overlaps is specified in advance, thereby generating the learning data closer to actual scanned image data in a combined manner (hereinafter, the region specified in the background image where handwriting overlaps will be referred to as a “combining region”). Only the differences from the first exemplary embodiment are described.

Figure 13:
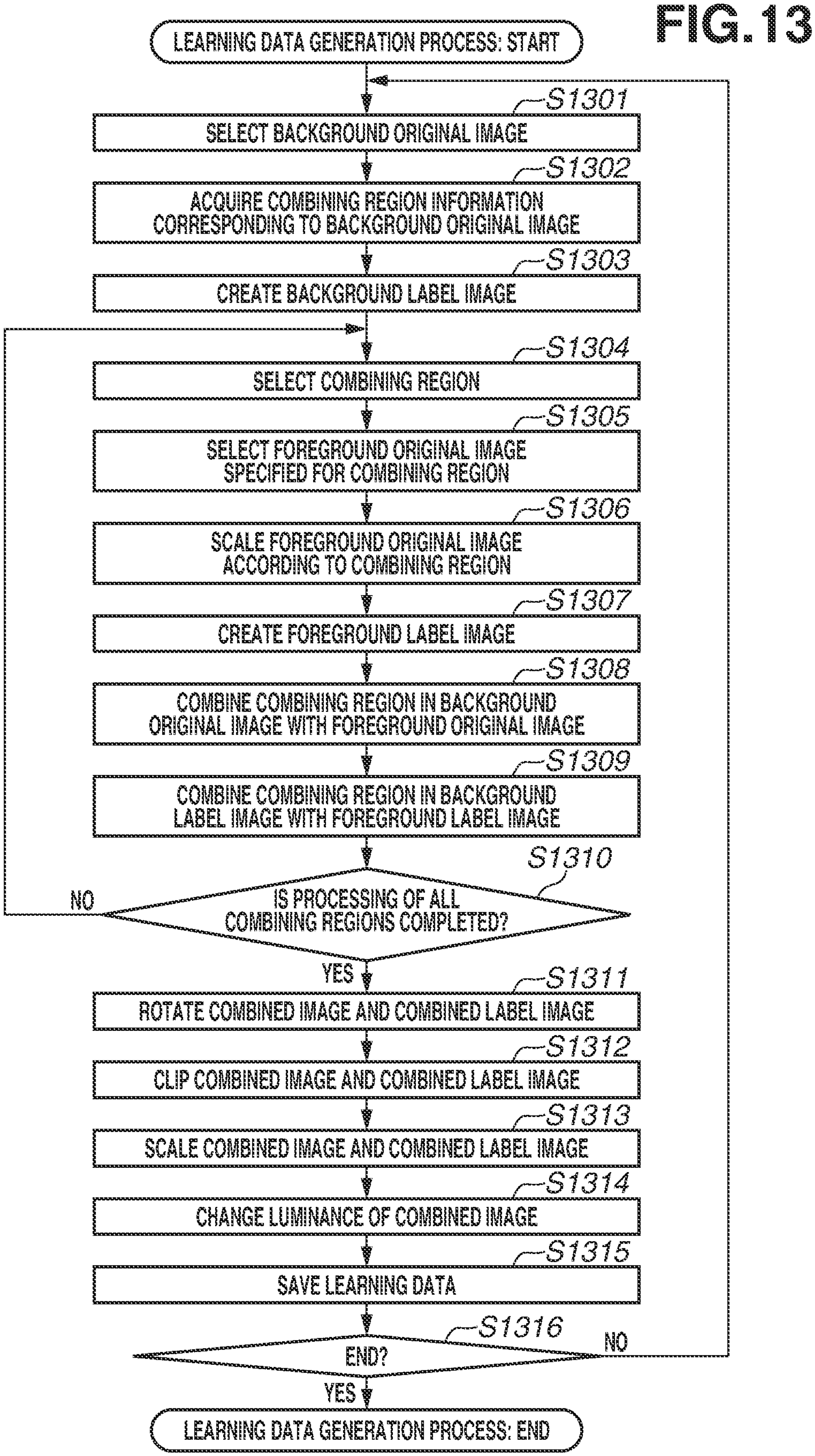
FIG. 13 is a flowchart of a learning data generation process according to a second exemplary embodiment.

A learning data generation process according to the present exemplary embodiment is described. FIG. 13 is a flowchart of the learning data generation process according to the present exemplary embodiment. The processing is implemented by the learning data generation unit 301 of the learning apparatus 102. Specifically, the processing is implemented by the CPU 231 loading a program stored in the ROM 232 into the RAM 234 and executing the program.

Figures 14A, 14B:
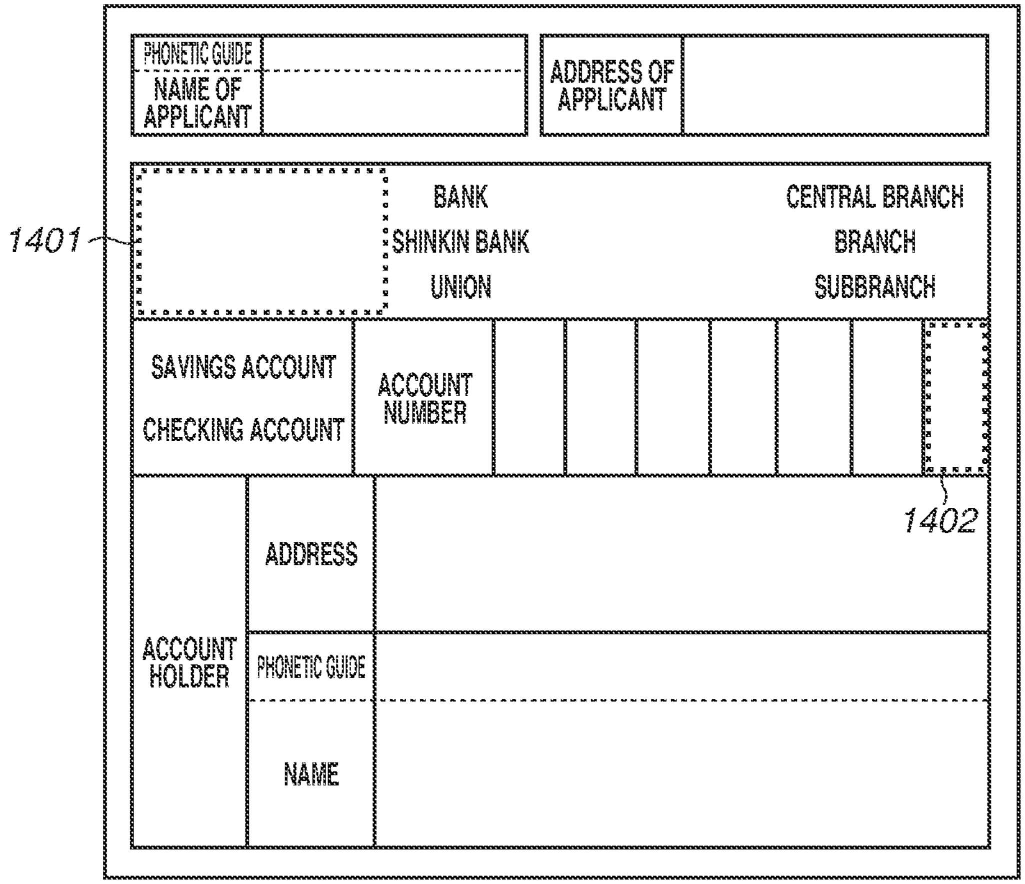
FIGS. 14A and 14B are diagrams illustrating examples of a background original image and combining region information according to the second exemplary embodiment.

First, in step S1301, the CPU 231 selects and reads a background original image stored in the storage 235. FIG. 14A illustrates an example of the background original image. A plurality of background original images is recorded in advance in the storage 235. The CPU 231 randomly selects one of the plurality of background original images.

In step S1302, the CPU 231 reads, from the storage 235, combining region information corresponding to the background original image selected in step S1301. Combining region information corresponding to all the background original images is created and recorded in the storage 235 in advance. With reference to FIG. 14B, the combining region information is described. The combining region information can be configured in a format such as Extensible Markup Language (XML). As illustrated in FIG. 14B, in the combining region information, a combining region in the background original image is described by an <area> tag. Each <area> tag includes a coordinate attribute indicating the coordinates of four corners of a combining region, and a category attribute indicating the attribute (type) of the foreground to be combined with the combining region. Specifically, for example, a line 1403 in FIG. 14B indicates a region 1401 in FIG. 14A. This region is where a character string is to be written. Thus, “string” indicating a character string is specified as the category attribute of the region. On the other hand, a line 1404 in FIG. 14B indicates a region 1402 in FIG. 14A. This region is where a number is to be written. Thus, “digit” indicating a number is specified as the category attribute of the region.

In step S1303, the CPU 231 creates a background label image. The background label image is an image which is of the same size as that of the background original image and in which all the pixels have a value indicating not handwriting (e.g., 0, the same hereinafter).

In step S1304, the CPU 231 selects a combining region. The CPU 231 selects one of combining regions that has not yet been combined with a foreground original image, from the combining region information acquired in step S1302.

Figure 15A:
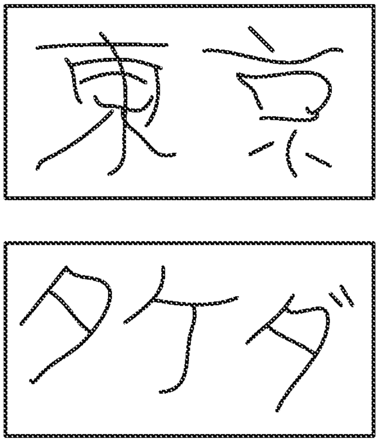
FIGS. 15A and 15B are diagrams illustrating examples of a foreground original image according to the second exemplary embodiment.
Figure 15B:
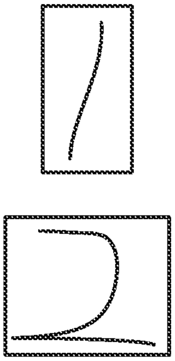

In step S1305, the CPU 231 selects and reads from the storage 235 a foreground original image having an attribute specified for the combining region. The CPU 231 references the category attribute of the combining region selected in step S1304 and randomly selects one of corresponding foreground original images. Foreground original images are separately created according to attributes and saved in advance in the storage 235. FIGS. 15A and 15B illustrate examples of the foreground original image. FIG. 15A illustrates foreground original images having the attribute “string”. FIG. 15B illustrates foreground original images having the attribute “digit”.

In step S1306, the CPU 231 scales the foreground original image according to the size of the combining region. The CPU 231 references the coordinate attribute of the combining region selected in step S1304, calculates the vertical and horizontal sizes of the combining region, and scales the foreground original image selected in step S1305 according to the calculated vertical and horizontal sizes.

In step S1307, the CPU 231 creates a foreground label image. The CPU 231 performs a binarization process on the foreground original image scaled in step S1306. Then, the CPU 231 generates, as a correct answer label image for the foreground original image, image data in which a pixel having a value lower than a threshold determined in advance has a value indicating handwriting (e.g., 255, the same below), and other pixels have a value indicating not handwriting.

In step S1308, the CPU 231 combines the combining region in the background original image with the foreground original image. The CPU 231 combines a region indicated by the coordinate attribute of the combining region selected in step S1304 in the background original image with the foreground original image scaled in step S1306. The combining is performed by comparing the same coordinates of the images and employing the pixel value having the lower luminance.

In step S1309, the CPU 231 combines the combining region in the background label image with the foreground label image. The CPU 231 combines a region indicated by the coordinate attribute of the combining region selected in step S1304 in the background label image with the foreground label image created in step S1307. The combining is performed by overwriting the combining region in the background label image with the foreground label image.

Figure 16A:
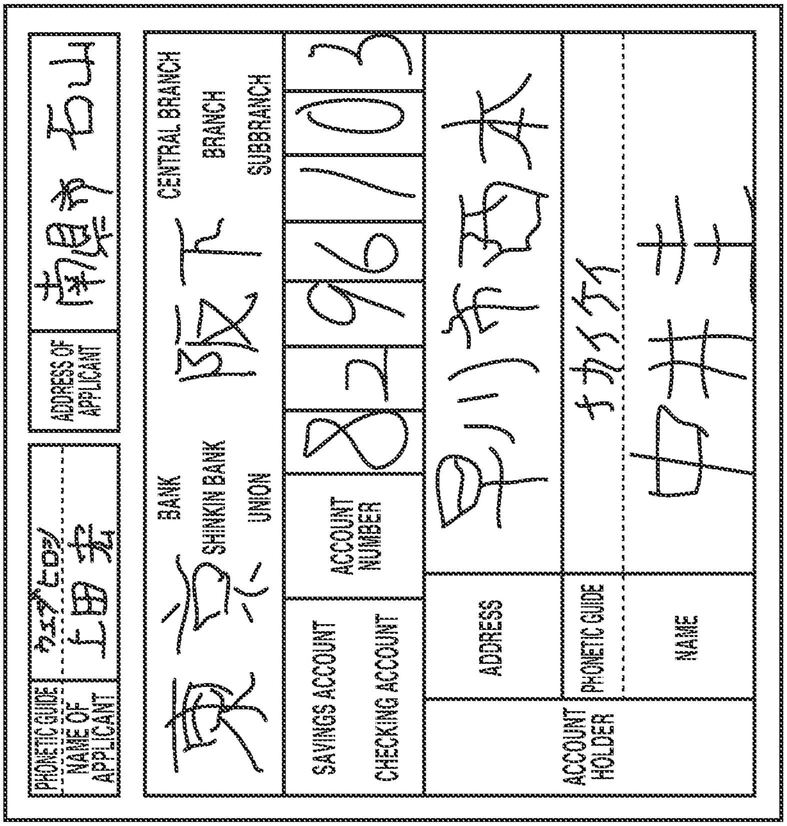
FIGS. 16A to 16D are diagrams illustrating examples of learning data created by the learning data generation process according to the second exemplary embodiment.
Figure 16B:
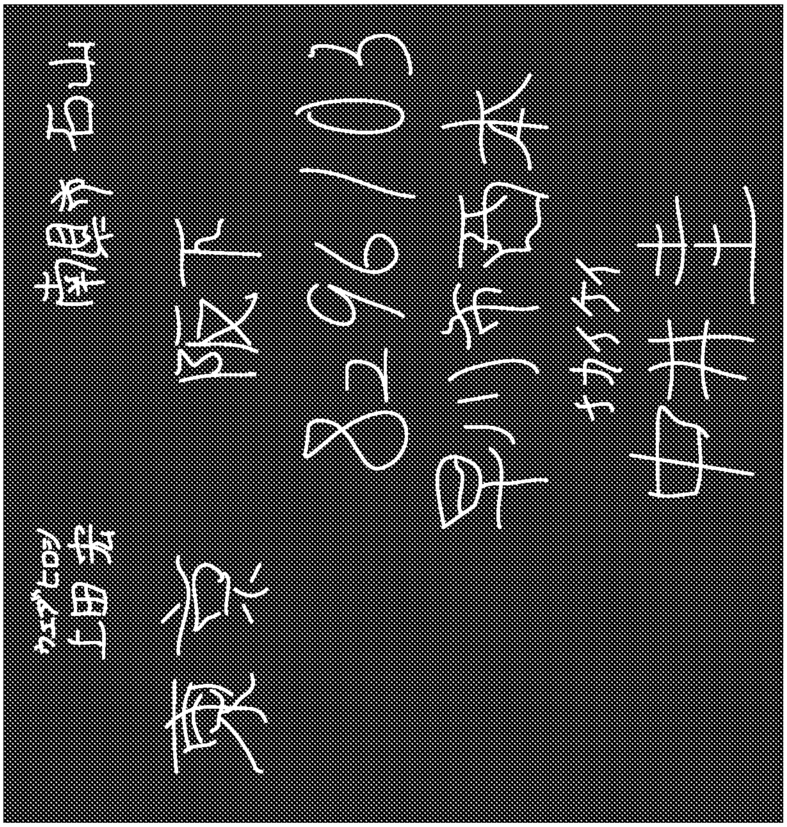

In step S1310, the CPU 231 determines whether with respect to all the combining regions included in the combining region information acquired in step S1302, the combining with the foreground original image is completed. If there is a region that has not yet been combined with the foreground original image (NO in step S1310), the processing returns to step S1304. If the combining of all the combining regions with the foreground original image is completed (YES in step S1310), the processing proceeds to step S1311. Hereinafter, the background original image and the background label image obtained by combining all the combining regions with the foreground original image at this time will be referred to as a "combined image" and a "combined label image", respectively. FIGS. 16A and 16B illustrate examples of the combined image and the combined label image, respectively.

In step S1311, the CPU 231 processes the combined image and the combined label image by rotating the combined image and the combined label image. The angle of rotation is randomly selected and determined within a predetermined range (e.g., between −10 degrees and 10 degrees). The combined image and the combined label image are rotated by the same angle of rotation.

In step S1312, the CPU 231 clips parts (e.g., a size of 512 vertical×512 horizontal pixels) of the combined image and the combined label image rotated in step S1311, thereby generating image data. The position of the clipping is randomly determined. The combined image and the combined label image are clipped at the same position.

In step S1313, the CPU 231 processes the combined image and the combined label image clipped in step S1312 by scaling the combined image and the combined label image. The scaling factor is randomly selected and determined within a predetermined range (e.g., between 50% and 150%). Further, the CPU 231 clips a part (e.g., a size of 256 vertical×256 horizontal pixels) of each scaled image from the center, thereby updating the image. The combined image and the combined label image are scaled by the same scaling factor.

Figure 16C:
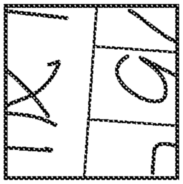
Figure 16D:
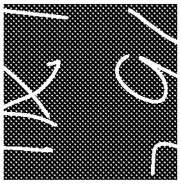

In step S1314, the CPU 231 processes the combined image by changing the luminance of each pixel of the combined image. The CPU 231 converts the combined image into a grayscale image and then changes the luminance of the combined image using gamma correction. The gamma value is randomly selected and determined within a predetermined range (e.g., between 0.1 and 10.0). FIGS. 16C and 16D illustrate examples of the combined image and the combined label image, respectively, at this time.

In step S1315, the CPU 231 saves the combined image and the combined label image created up to step S1314 in association with each other as learning data in a predetermined region of the storage 235.

In step S1316, the CPU 231 determines whether the learning data generation process is to be ended. If as many pieces of learning data as the number of pieces of learning data determined in advance are generated (YES in step S1316), the processing ends. If not (NO in step S1316), the processing returns to step S1301.

According to the learning data generation process described above, it is possible to generate learning data more similar to actual scanned image data in a combined manner.

In the learning data generation process according to the present exemplary embodiment, the foreground original image may be scaled to be smaller than the combining region and combined with the combining region at a random position in the combining region. Thus, it is possible to increase the diversity of the size or the position of a handwritten character to be written within a frame of a form in learning data.

In the learning data generation process according to the present exemplary embodiment, the region to be combined with the foreground original image may be shifted from the combining region, or the foreground original image may be scaled to be larger than the combining region such that a combined image is created in which the foreground original image overlaps with a ruled line in the background original image. Thus, it is possible to create the learning data in which the writing of handwriting that sticks out of a frame of a form is reproduced.

In the learning data generation process according to the present exemplary embodiment, among all the combining regions included in the background original image, a region that is not to be combined with the foreground original image may be set in a certain proportion. Thus, it is possible to create the learning data in which a blank in a form is reproduced.

A third exemplary embodiment is described below. In the present exemplary embodiment, another method for the learning data combining process and the OCR process are described. In the present exemplary embodiment, learning and inference are performed so that an item selected by a symbol such as a handwritten circle or check in a form can also be extracted. Only the differences from the first and second exemplary embodiments are described.

Figure 17:
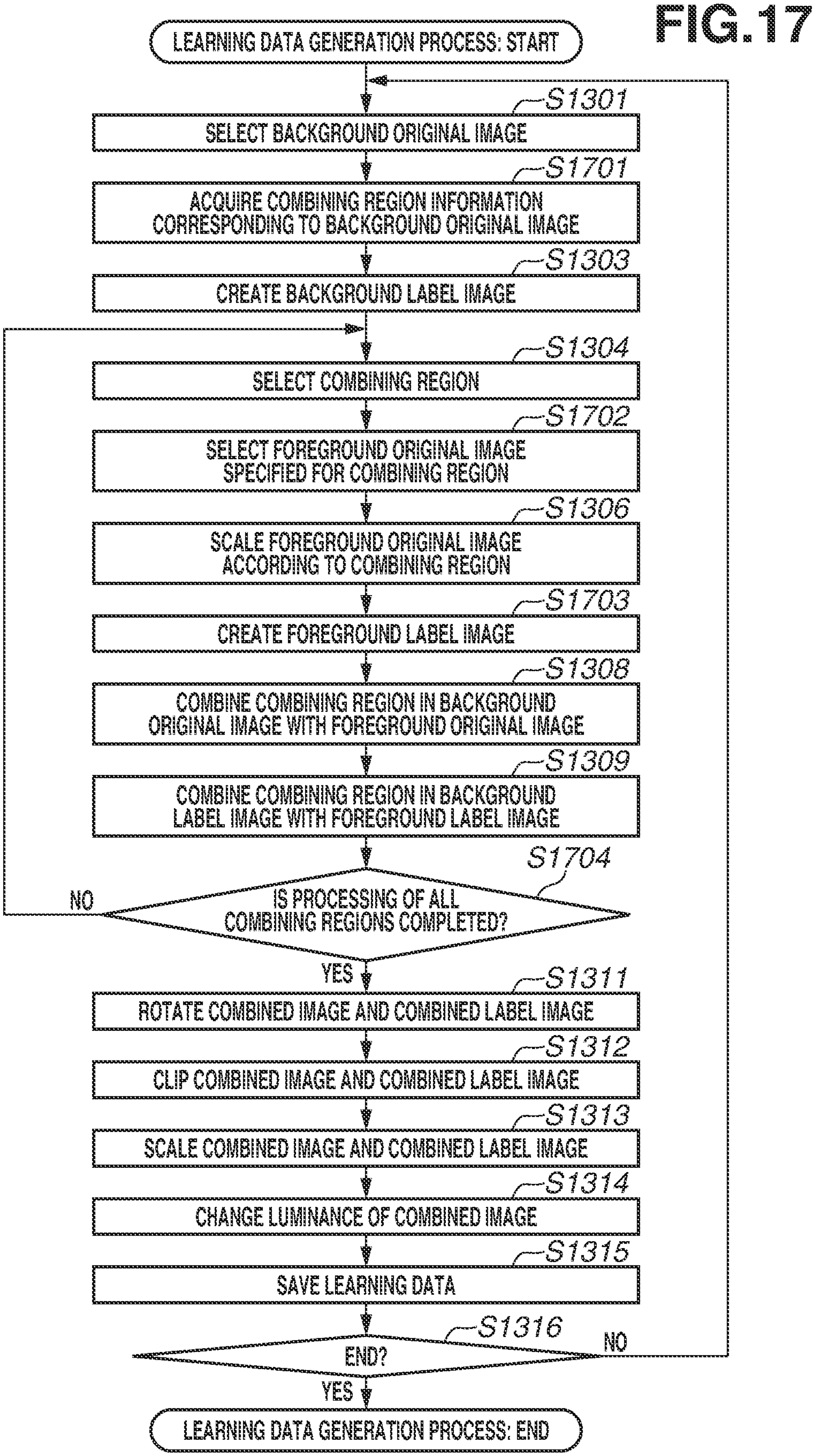
FIG. 17 is a flowchart of a learning data generation process according to a third exemplary embodiment.

First, a learning data generation process according to the present exemplary embodiment is described. FIG. 17 is a flowchart of the learning data generation process according to the present exemplary embodiment. The processing is implemented by the learning data generation unit 301 of the learning apparatus 102. Specifically, the processing is implemented by the CPU 231 loading a program stored in the ROM 232 into the RAM 234 and executing the program.

The process of step S1301 is a processing step similar to the processing step having the same number in the flowchart in FIG. 13.

Figures 18A, 18B:
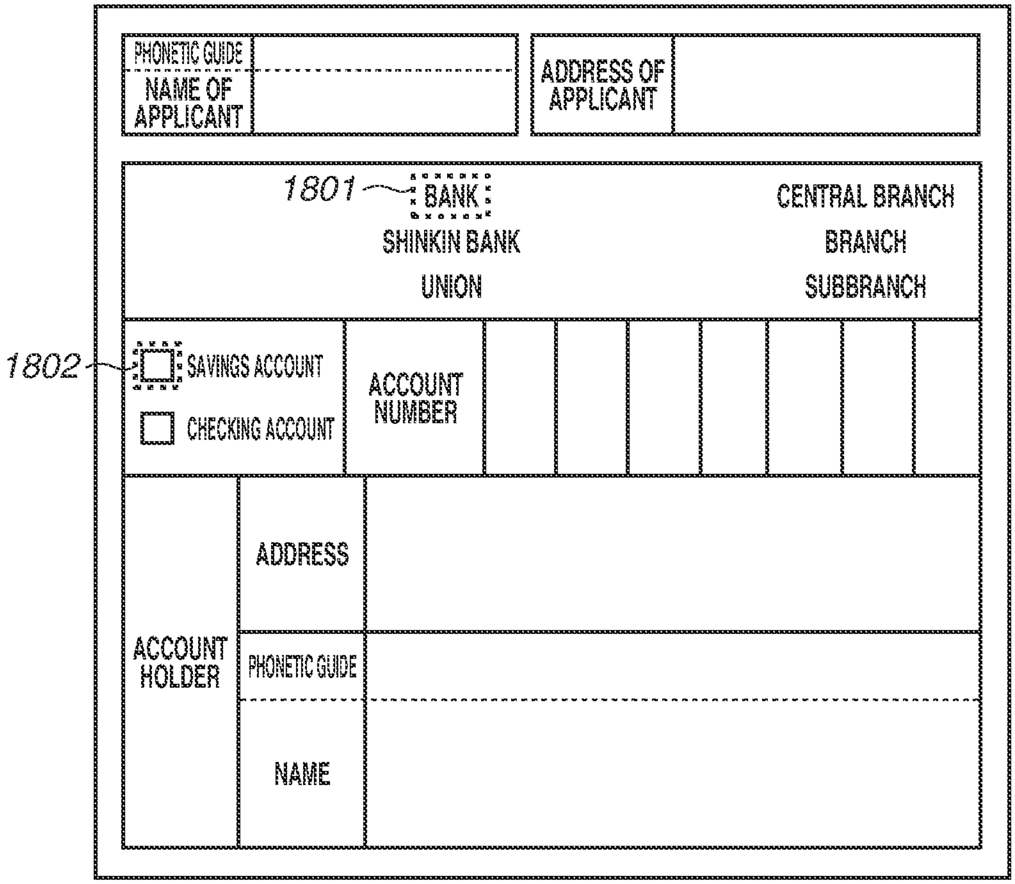
FIGS. 18A and 18B are diagrams illustrating examples of a background original image and combining region information according to the third exemplary embodiment.

In step S1701, the CPU 231 reads, from the storage 235, combining region information corresponding to the background original image selected in step S1301. FIGS. 18A and 18B illustrate the background original image and the combining region information corresponding to the background original image according to the present exemplary embodiment. Combining regions according to the present exemplary embodiment also include a region to be combined with a handwritten circle or check in addition to the combining regions according to the second exemplary embodiment (illustrated in FIG. 14A). More specifically, for example, a line 1803 in FIG. 18B indicates a region 1801 in FIG. 18A. This region is a region where a circle is to be written. Thus, "circle" indicating a character string is specified as the category attribute of the region. On the other hand, a line 1804 in FIG. 18B indicates a region 1802 in FIG. 18A. This region is a region where a check is to be written. Thus, "check" indicating a number is specified as the category attribute of the region.

The processes of steps S1303 and S1304 are process steps similar to the process steps having the same numbers in the flowchart in FIG. 13.

Figure 19A:
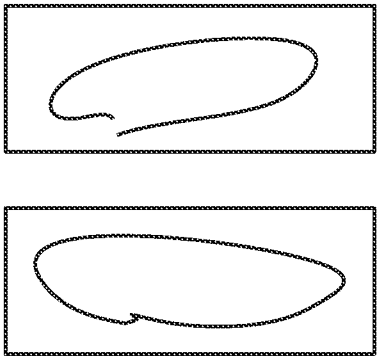
FIGS. 19A and 19B are diagrams illustrating examples of a foreground original image according to the third exemplary embodiment.
Figure 19B:
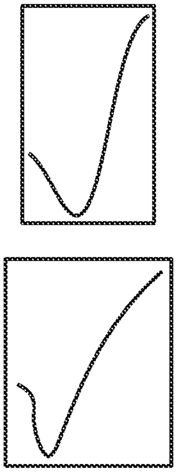

In step S1702, the CPU 231 selects a foreground original image specified for the combining region. At this time, if "circle" is specified as the category attribute of the combining region, an image as illustrated in FIG. 19A is selected. If "check" is specified as the category attribute of the combining region, an image as illustrated in FIG. 19B is selected.

The process of step S1306 is a process step similar to the process step having the same number in the flowchart in FIG. 13.

In step S1703, the CPU 231 creates a foreground label image. The CPU 231 performs a binarization process on the foreground original image scaled in step S1306. Then, the CPU 231 creates a label image according to an attribute specified by the category attribute of the combining region. Specifically, if the category attribute is "string" or "digit", the CPU 231 creates a label image in which a pixel having a value lower than a threshold determined in advance has a value indicating a handwritten character (e.g., 255, the same hereinafter). If the category attribute is "circle", the CPU 231 creates a label image in which a pixel having a value lower than the threshold determined in advance has a value indicating a handwritten circle (e.g., 165, the same hereinafter). If the category attribute is "check", the CPU 231 creates a label image in which a pixel having a value lower than the threshold determined in advance has a value indicating a handwritten check (e.g., 127, the same hereinafter). In any case, a pixel having a value higher than the threshold determined in advance has a value indicating not handwriting (e.g., 0, the same hereinafter).

The processes of steps S1308 and S1309 are process steps similar to the process steps having the same numbers in the flowchart in FIG. 13.

Figure 20A:
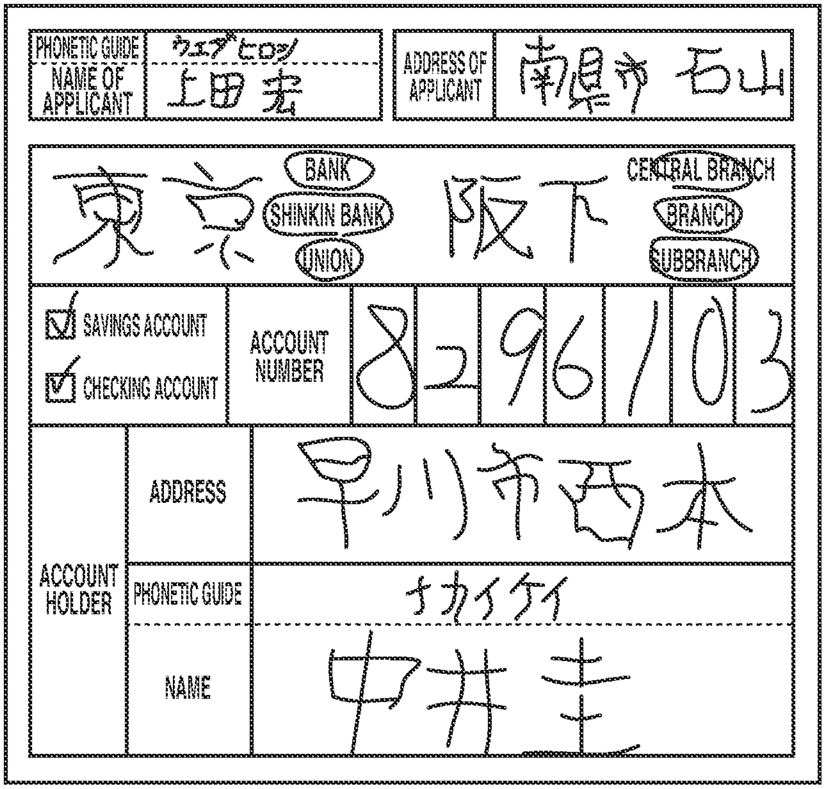
FIGS. 20A and 20B are diagrams illustrating examples of learning data created by the learning data generation process according to the third exemplary embodiment.
Figure 20B:
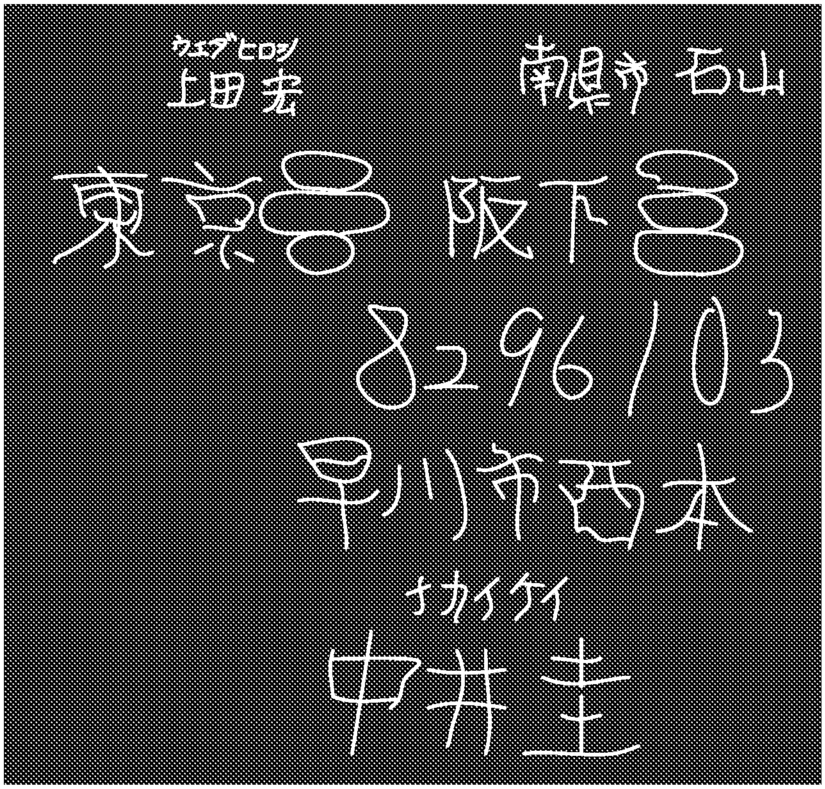

In step S1704, the CPU 231 determines whether the combining of all the combining regions included in the combining region information acquired in step S1701 is completed with respect to the foreground original image. If there is a region that has not yet been combined with the foreground original image (NO in step S1704), the processing proceeds to step S1304. If the combining of all the combining regions is completed with respect to the foreground original image (YES in step S1704), the processing proceeds to step S1311. Hereinafter, the background original image and the background label image obtained by combining all the combining regions with the foreground original image at this time will be referred to as a "combined image" and a "combined label image", respectively. FIGS. 20A and 20B illustrate examples of the combined image and the combined label image created in the present exemplary embodiment.

The processes of steps S1311 to S1316 are process steps similar to the process steps having the same numbers in the flowchart in FIG. 13.

Figure 21:
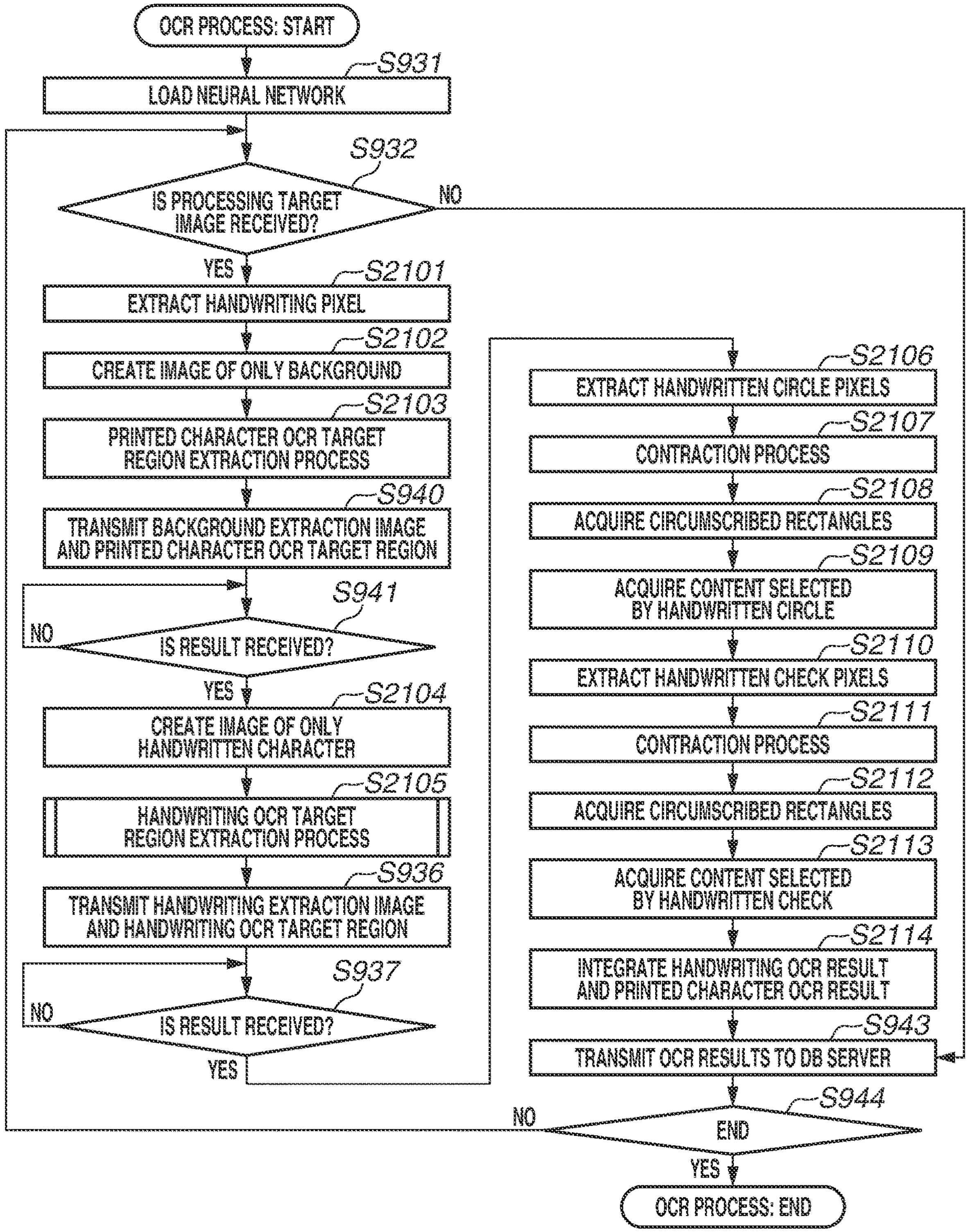
FIG. 21 is a flowchart of an OCR process according to the third exemplary embodiment.

Next, an OCR process according to the present exemplary embodiment is described. FIG. 21 is a flowchart of the OCR process according to the present exemplary embodiment. This processing is implemented by the CPU 261 of the image processing server 103 reading the image processing server program stored in the storage 265, loading the image processing server program into the RAM 264, and executing the image processing server program. This processing is started by the user turning on the power supply of the image processing server 103.

The processes of steps S931 and S932 are process steps similar to the process steps having the same numbers in the flowchart in FIG. 9B.

Figure 22A:
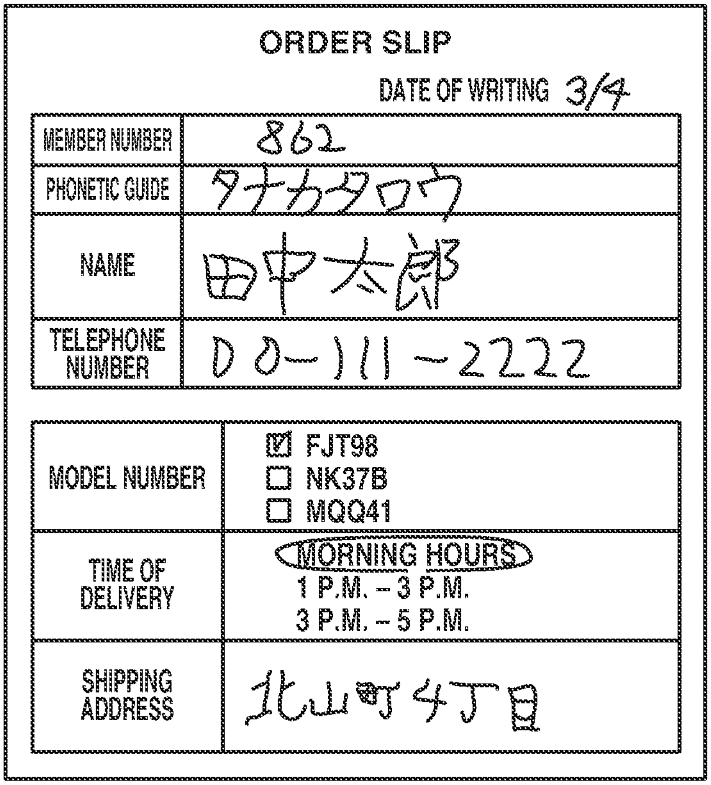
FIGS. 22A and 22B are diagrams illustrating an example of a processing target image and a result of estimating a handwriting pixel from the processing target image according to the third exemplary embodiment.
Figure 22B:
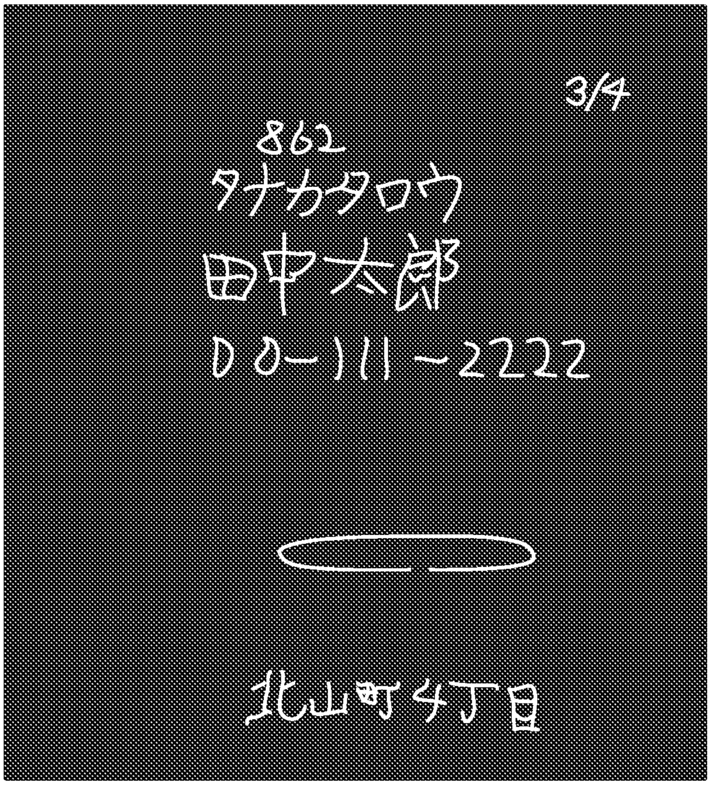

In step S2101, the CPU 261 extracts a handwriting pixel from the processing target image received from the image processing apparatus 101. The CPU 261 converts the processing target image into a grayscale image. Then, the CPU 261 inputs the processing target image as the grayscale image to the neural network constructed in step S931 and causes the neural network to estimate a handwriting pixel. As a result, image data is obtained which is of the same size as that of the processing target image and in which a value indicating a handwritten character (e.g., 1) is recorded in a pixel determined as a handwritten character. Image data is obtained in which a value indicating a handwritten circle (e.g., 2) is recorded in a pixel determined as a handwritten circle. Image data is obtained in which a value indicating a handwritten check (e.g., 3) is recorded in a pixel determined as a handwritten check. Image data is obtained in which a value indicating not handwriting (e.g., 0) is recorded in a pixel determined as not handwriting. FIG. 22B illustrates an image of the result of estimating a handwriting pixel using an image in FIG. 22A as the processing target image (to facilitate visualization of the result, in FIG. 22B, a pixel having a value of 0 is represented in black, a pixel having a value of 1 is represented in white, a pixel having a value of 2 is represented in light gray, and a pixel having a value of 3 is represented in dark gray). Hereinafter, this image data will be referred to as an "estimation result".

Figure 23A:
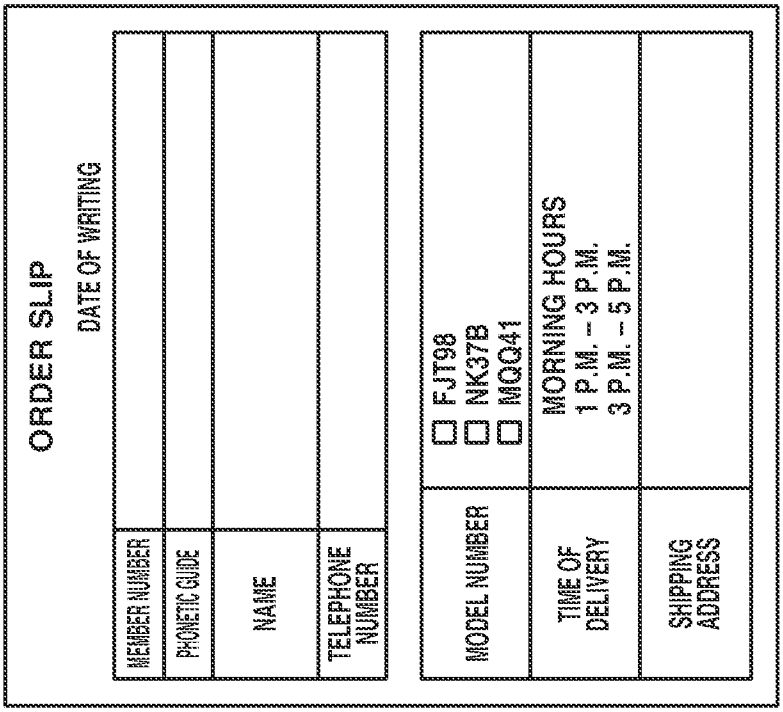
FIGS. 23A to 23D are diagrams illustrating a background extraction image, a handwritten character extraction image, a handwritten circle extraction image, and a handwritten check extraction image according to the third exemplary embodiment.

In step S2102, the CPU 261 creates an image of only the background using the estimation result created in step S2101 as a mask. Specifically, the CPU 261 creates an image which is of the same size as that of the processing target image and in which the pixel value of the processing target image is substituted into the coordinates of a pixel not corresponding to handwriting according to the estimation result, and 255 is substituted into the coordinates of other pixels. Hereinafter, this image will be referred to as a "background extraction image". FIG. 23A illustrates the background extraction image created at this time.

Figure 24A:
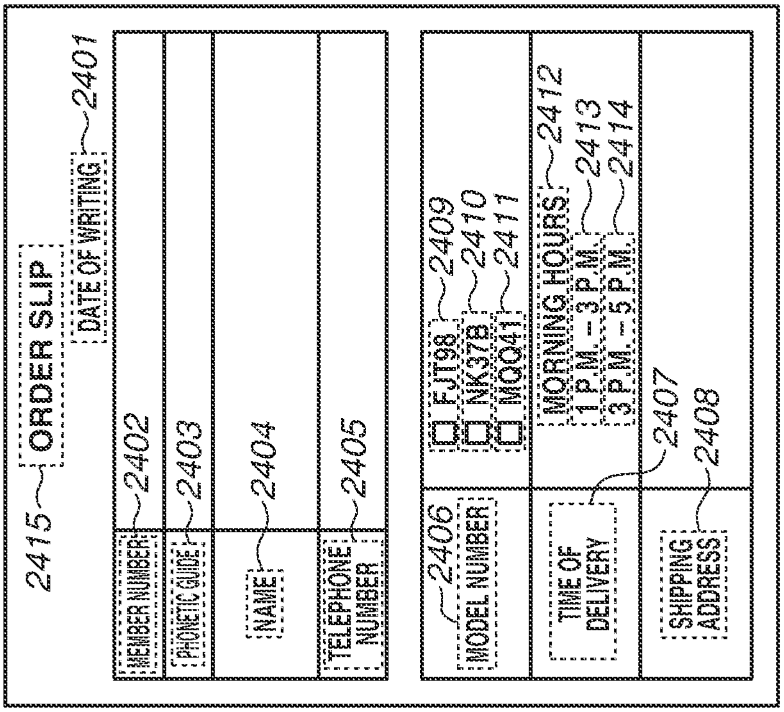
FIGS. 24A to 24D are diagrams illustrating a printed character OCR target region, a handwriting OCR target region, a circumscribed rectangle of a handwritten circle, and a circumscribed rectangle of a handwritten check according to the third exemplary embodiment.

In step S2103, the CPU 261 performs a process for extracting a printed character OCR target region and determines a region as a target of printed character OCR in the background extraction image. This process is similar to that of step S939 in FIG. 9B. Printed character OCR target regions obtained as a result of this process are illustrated as regions 2401 to 2415 in FIG. 24A.

The processes of steps S940 and S941 are process steps similar to the process steps having the same numbers in the flowchart in FIG. 9B.

Figure 23B:
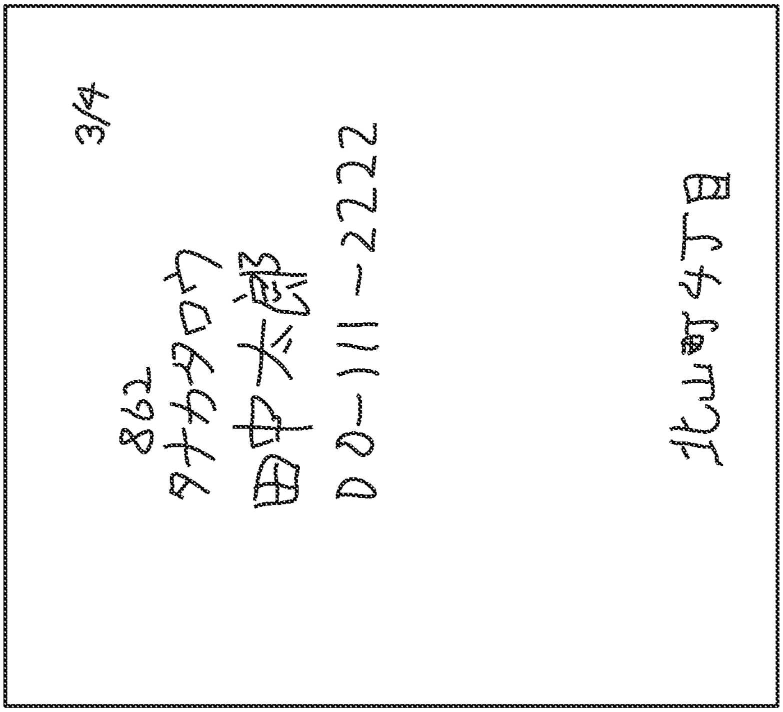

In step S2104, the CPU 261 creates an image of only a handwritten character using the estimation result created in step S2101 as a mask. Specifically, the CPU 261 creates an image which is of the same size as that of the processing target image and in which the pixel value in the processing target image is substituted into the coordinates of a pixel corresponding to a handwritten character according to the estimation result, and 255 is substituted into the coordinates of other pixels. Hereinafter, this image will be referred to as a "handwritten character extraction image". FIG. 23B illustrates the handwritten character extraction image created at this time.

Figure 24B:
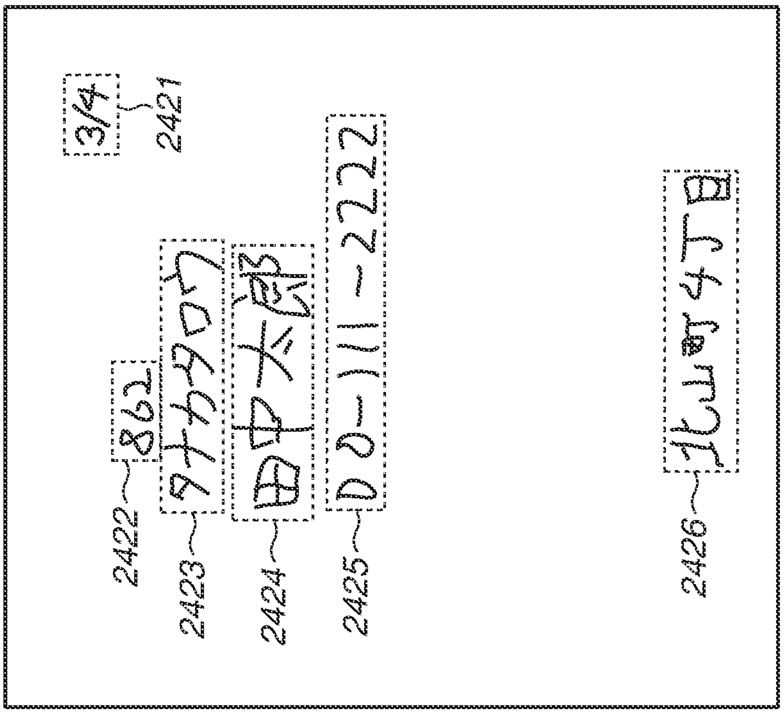

In step S2105, the CPU 261 performs a process for extracting a handwriting OCR target region and determines a region as a target of handwriting OCR in the handwritten character extraction image. This process is similar to that illustrated in FIG. 9C. Handwriting OCR target regions obtained as a result of this process are illustrated as regions 2421 to 2426 in FIG. 24B.

The processes of steps S936 and S937 are process steps similar to the process steps having the same numbers in the flowchart in FIG. 9B.

Figure 23D:
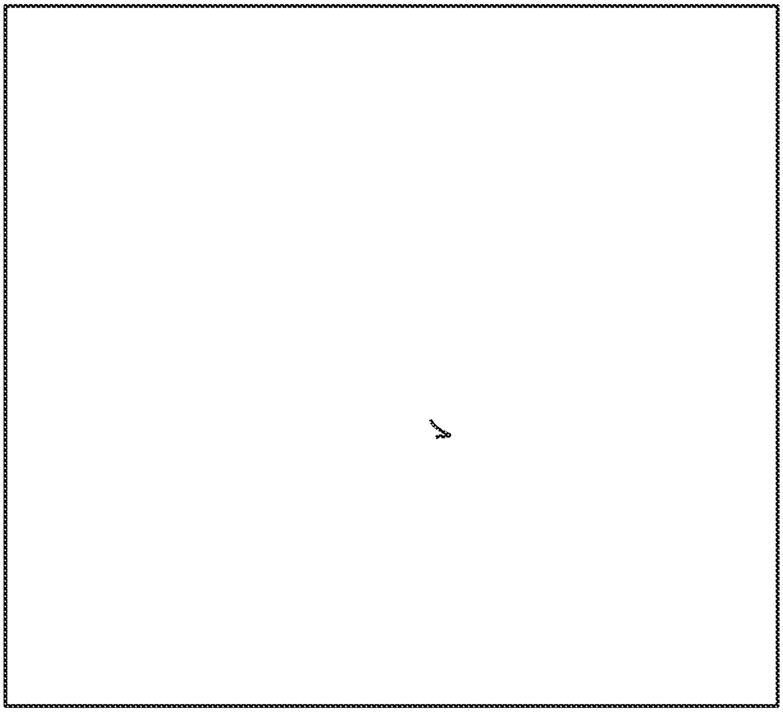
Figure 23C:
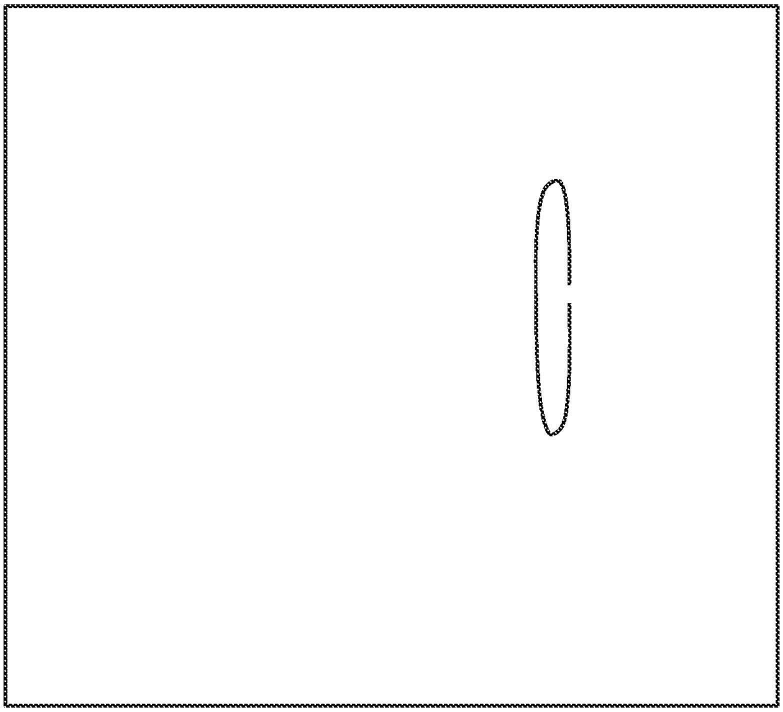

In step S2106, the CPU 261 creates an image of only a handwritten circle using the estimation result created in step S2101 as a mask. Specifically, the CPU 261 creates an image which is of the same size as that of the processing target image and in which the pixel value in the processing target image is substituted into the coordinates of a pixel corresponding to a handwritten circle according to the estimation result, and 255 is substituted into the coordinates of other pixels. Hereinafter, this image will be referred to as a "handwritten circle extraction image". FIG. 23C illustrates the handwritten circle extraction image created at this time.

In step S2107, the CPU 261 performs a contraction process on the handwritten circle extraction image. This is the process of restoring a region of a handwritten circle divided in the process of the extraction.

Figure 24D:
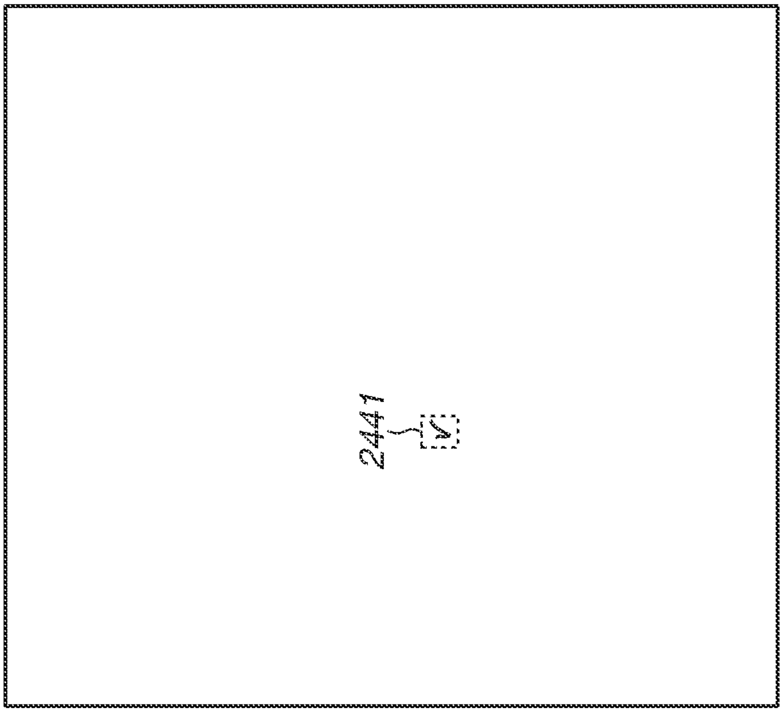
Figure 24C:
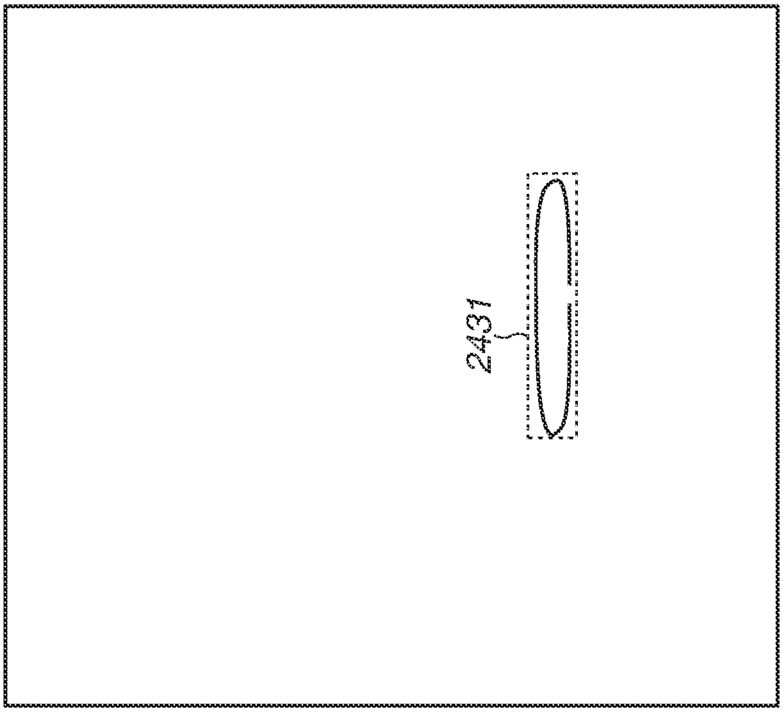

In step S2108, the CPU 261 individually creates circumscribed rectangles of all the regions where black pixels are linked together in the handwritten circle extraction image. A circumscribed rectangle obtained at this time is illustrated as a region 2431 in FIG. 24C.

In step S2109, the CPU 261 acquires a content selected by surrounding with a handwritten circle. Specifically, first, the CPU 261 calculates the center of gravity of each circumscribed rectangle obtained in step S2108. Then, regarding the center of gravity of each circumscribed rectangles, the CPU 261 references the printed character OCR result received in step S941 and acquires the OCR result of a printed character OCR target region including the coordinates of the center of gravity. The OCR result is regarded as a content selected by a handwritten circle included in the circumscribed rectangle. A description will be given by using the region 2431 in FIG. 24C as an example. A target region of printed character OCR including the coordinates of the center of the region 2431 is a region 2412. Thus, "morning hours", which is the OCR result of the region 2412, is a content selected by the handwritten circle of the region 2431.

In step S2110, the CPU 261 creates an image of only a handwritten check using the estimation result created in step S2101 as a mask. Specifically, the CPU 261 creates an image which is of the same size as that of the processing target image and in which the pixel value in the processing target image is substituted into the coordinates of a pixel corresponding to a handwritten check according to the estimation result, and 255 is substituted into the coordinates of other pixels. Hereinafter, this image will be referred to as a "handwritten check extraction image". FIG. 23D illustrates the handwritten check extraction image created at this time.

In step S2111, the CPU 261 performs a contraction process on the handwritten check extraction image. This is the process of restoring a region of a handwritten check divided in the process of the extraction.

In step S2112, the CPU 261 individually creates circumscribed rectangles of all the regions where black pixels are linked together in the handwritten check extraction image. A circumscribed rectangle obtained at this time is illustrated as a region 2441 in FIG. 24D.

In step S2113, the CPU 261 acquires a content selected by a handwritten check. Specifically, first, the CPU 261 calculates the center of gravity of each circumscribed rectangle obtained in step S2112. Then, regarding the center of gravity of each circumscribed rectangle, the CPU 261 references the printed character OCR result received in step S941 and acquires the OCR result of the printed character OCR target region closest to the coordinates of the center of gravity. The CPU 261 determines this OCR result as a content selected by a handwritten check included in the circumscribed rectangle. Its description is given by using the region 2441 in FIG. 24D as an example. The target region of printed character OCR closest to the coordinates of the center of gravity of the region 2441 is a region 2409. Thus, "FJT98", which is the OCR result of the region 2409, is a content selected by the handwritten check of the region 2441.

In step S2114, the CPU 261 integrates the handwriting OCR result and the printed character OCR result. The CPU 261 evaluates the positional relationship between the handwriting OCR target region and the printed character OCR target region from which the handwriting OCR result and the printed character OCR result are obtained, and evaluates the semantic appropriateness when the printed character OCR result is considered as an item name and the handwriting OCR result is considered as a value, thereby estimating a pair of an item and a value. At this time, the circumscribed rectangles of the handwritten circles acquired in step S2108 and the circumscribed rectangles of the handwritten checks acquired in step S2112 are also treated as target regions of handwriting OCR. The content selected by the handwritten circle acquired in step S2109 and the content selected by the handwritten check acquired in step S2113 are also treated as handwriting OCR results. For example, if the region in the background extraction image closest to the region 2431, which is the circumscribed rectangle of the handwritten circle, is a region 2407, and the OCR result "time of delivery" of the region is an item name, "morning hours" which is the content selected by the handwritten circle of the region 2431, includes time and therefore is highly appropriate as a value. Thus, the CPU 261 estimates that the OCR result of the region 2407 and the content selected by the handwritten circle of the region 2431 are a pair of an item and a value regarding the time of delivery.

The processes of steps S943 and S944 are process steps similar to the processing steps having the same numbers in the flowchart in FIG. 9B.

Based on the learning data generation process and the OCR process described above, it is possible to perform learning and inference so that an item selected by a handwritten circle or check in a form can also be extracted.

In step S1309 in the learning data generation process according to the present exemplary embodiment, the entirety of the combining region in the background label may not be overwritten with the foreground label, but the combining region in the background original image and the foreground original image may be compared with each other, and only a region where the foreground original image has lower luminance may be overwritten with the foreground label. Learning is performed using this label, whereby a region where handwriting overlaps with a ruled line or a printed character in the background is inferred as the background. Consequently, when an image of only the background is created in step S2102 in the OCR process, a printed character overlapping with a handwritten circle is not divided, and the accuracy of printed character OCR can be improved.

In the present exemplary embodiment, handwriting is classified into three types, namely a character, a circle, and a check, and different values are used for labels. The classification, however, is not limited to the embodiment. For example, another label may be assigned to a handwritten number or symbol.

Finally, the experimental results of verifying that a learning data generation method according to the present disclosure is useful in extracting handwriting written in a form are illustrated.

The verification was performed using two models trained by changing only the process of generating learning data, using the same neural network, the same foreground original image, and the same background original image. One of the models is a model created according to the present disclosure, and another model is a model trained by employing a method for, when learning data is generated, combining the foreground original image and the background original image not by overlapping both images, but by arranging the foreground original image and the background original image one above the other or side by side. Values were written with a handwritten character, a handwritten circle, and a handwritten check to a printed form, handwriting was extracted from a scanned image using each model, and the models were compared with each other regarding how much handwriting can be extracted without excess or deficiency. In the comparison, a conformity rate (an indicator representing the lowness of the rate at which a pixel not corresponding to handwriting is erroneously determined as handwriting, such that the closer to 1 the conformity rate is, the lower the rate of the erroneous determination is) and recall rate (an indicator representing the lowness of the rate at which a handwriting pixel is erroneously determined as not handwriting, such that the closer to 1 the recall rate is, the lower the rate of the erroneous determination is) are used.

FIG. 25 illustrates the experimental results. FIG. 25 illustrates the averages of the conformity rate and the recall rate when handwriting is extracted using 16 forms different in contents as targets. As can be seen from FIG. 25, the model according to the present disclosure could perform extraction for each of the handwritten character, the handwritten circle, and the handwritten check with higher conformity and recall rates. Based on the above, by employing the learning data generation method according to the present disclosure, it is possible to more accurately extract handwriting written in a form.

Other Exemplary Embodiments

In the above description, the image processing apparatus 101, the image processing server 103, the printed character OCR server 104, the handwriting OCR server 105, and the DB server 106 are all separate apparatuses. The present disclosure, however, is not limited to this configuration. Alternatively, some or all of the above functions may be aggregated to be performed in the same apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-158665, filed Aug. 30, 2019, which is hereby incorporated by reference herein in its entirety.

What is claimed is:

1. An image processing system comprising:
at least one memory; and
at least one processor that performs:
combining a handwriting image and a background image, thereby generating a combined image;
generating a correct answer label image by performing a binarization process on the handwriting image; and
using the generated combined image and the generated correct answer label image as learning data for training a neural network, wherein the neural network trained based on the learning data is a neural network for extracting handwriting pixels from an input image,
wherein a first character recognition process is executed on an image including handwriting pixels extracted from the input image by the trained neural network, and
wherein a second character recognition process is executed on an image that does not include the handwriting pixels.

2. The image processing system according to claim 1, wherein the combined image is generated by overlapping the handwriting image on the background image.

3. The image processing system according to claim 1, wherein the combined image is generated by combining the handwriting image and the background image such that the handwriting image overlaps with a region in the background image that is specified in advance.

4. The image processing system according to claim 1, wherein a pair of an item and a value is saved based on a first character recognition result of handwritten characters obtained by the first character recognition process and a second character recognition result of printed characters obtained by the second character recognition process.

5. The image processing system according to claim 1, wherein the input image is an image generated by scanning a document.

6. An image processing system comprising:
at least one memory; and
at least one processor that performs:
combining a handwriting image and a background image, thereby generating a combined image;
generating a correct answer label image by performing a binarization process on the handwriting image, wherein the correct answer label image is generated based on a result of the binarization process performed on the handwriting images and types of the handwriting images, and wherein values of pixels in the correct answer label image are different from each other according to the types of the handwriting images; and
using the generated combined image and the generated correct answer label image as learning data for training a neural network, wherein the neural network trained based on the learning data is a neural network for extracting handwriting pixels from an input image with respect to each of the types of handwriting.

7. The image processing system according to claim 6, wherein the types of handwriting include a handwritten character and a handwritten symbol.

8. An image processing system comprising:
at least one memory; and
at least one processor that performs:
combining a handwriting image and a background image, thereby generating a combined image;
generating a correct answer label image by performing a binarization process on the handwriting image; and
using the generated combined image and the generated correct answer label image as learning data for training a neural network, wherein the neural network trained based on the learning data is a neural network for extracting handwriting pixels from an input image, and wherein a learning process for training the neural network using the learning data is executed by an apparatus different from an apparatus having generated the combined image and the correct answer label image.

9. An image processing method comprising:
combining a handwriting image and a background image, thereby generating a combined image;
generating a correct answer label image by performing a binarization process on the handwriting image; and
performing control to execute a learning process for training a neural network using the generated combined image and the generated correct answer label image, wherein the neural network trained based on the learning data is a neural network for extracting a handwriting pixels from an input image,
wherein a first character recognition process is executed on an image including handwriting pixels extracted from the input image by the trained neural network, and
wherein a second character recognition process is executed on an image that does not include the handwriting pixels.

10. The image processing method according to claim 9, wherein the combined image is generated by overlapping the handwriting image on the background image.

11. The image processing method according to claim 9, wherein the combined image is generated by combining the handwriting image and the background image such that the handwriting image overlaps with a region in the background image that is specified in advance.

12. The image processing method according to claim 9, further comprising:
performing control to execute a first character recognition process on an image including a handwriting pixel extracted from the input image by the trained neural network; and
performing control to execute a second character recognition process on an image that does not include the handwriting pixel.

13. The image processing method according to claim 12, wherein a pair of an item and a value is saved based on a first character recognition result of handwritten characters obtained by the first character recognition process and a second character recognition result of printed characters obtained by the second character recognition process.

14. The image processing method according to claim 9,
wherein the correct answer label image is generated based on a result of the binarization process performed on the handwriting images and types of the handwriting images, and wherein values of pixels in the correct answer label image are different from each other according to the types of the handwriting images, and
wherein the neural network trained by the learning process is a neural network for extracting a handwriting pixel from an input image with respect to each of the types of handwriting.

15. The image processing method according to claim 14, wherein the types of handwriting include a handwritten character and a handwritten symbol.

16. The image processing method according to claim 9, wherein the input image is an image generated by scanning a document.

17. A non-transitory computer readable storage medium storing a program for causing a processor to perform:
combining a handwriting image and a background image, thereby generating a combined image;
generating a correct answer label image by performing a binarization process on the handwriting image; and
using the generated combined image and the generated correct answer label image as learning data for a neural network, wherein the neural network trained based on the learning data is a neural network for extracting handwriting pixels from an input image,
wherein a first character recognition process is executed on an image including handwriting pixels extracted from the input image by the trained neural network, and
wherein a second character recognition process is executed on an image that does not include the handwriting pixels.

* * * * *